US012789240B2

(12) United States Patent
Haugen et al.

(10) Patent No.: US 12,789,240 B2
(45) Date of Patent: Nov. 10, 2026

(54) RANGE EXHAUST CLEANING SYSTEMS AND METHODS USING DETECTION AND CONTROL

(71) Applicant: Restaurant Technologies, Inc., Mendota Heights, MN (US)

(72) Inventors: Kyle Haugen, St. Louis Park, MN (US); Jason Platz, Mendota Heights, MN (US)

(73) Assignee: KEPT COMPANIES, INC., Fairfield, NJ (US)

(*) Notice: Subject to any disclaimer, the term of this patent is extended or adjusted under 35 U.S.C. 154(b) by 47 days.

(21) Appl. No.: 18/775,654

(22) Filed: Jul. 17, 2024

(65) Prior Publication Data

US 2024/0399421 A1 Dec. 5, 2024

Related U.S. Application Data

(63) Continuation-in-part of application No. 18/096,745, filed on Jan. 13, 2023, now Pat. No. 12,453,988.

(60) Provisional application No. 63/547,728, filed on Nov. 8, 2023.

(51) Int. Cl.
*B08B 3/02* (2006.01)
*F24C 15/20* (2006.01)

(52) U.S. Cl.
CPC ............ *B08B 3/02* (2013.01); *B08B 2203/02* (2013.01); *F24C 15/20* (2013.01)

(58) Field of Classification Search
CPC ....... B08B 2203/02; B08B 3/02; F24C 15/20; F24C 15/2021; F24C 15/2057
See application file for complete search history.

(56) References Cited

U.S. PATENT DOCUMENTS

| | | | | |
|---|---|---|---|---|
| 4,987,882 | A | 1/1991 | Kaufman | |
| 5,441,063 | A * | 8/1995 | Fernandez | B08B 9/32 134/144 |
| 5,472,342 | A | 12/1995 | Welsh et al. | |
| 2005/0109374 | A1 | 5/2005 | Letessier et al. | |
| 2009/0013989 | A1 * | 1/2009 | Brown | F24C 15/2057 454/67 |
| 2011/0214565 | A1 | 9/2011 | Kwok et al. | |

(Continued)

FOREIGN PATENT DOCUMENTS

| | | |
|---|---|---|
| CN | 106765668 A | 5/2017 |
| CN | 108561916 A | 9/2018 |

(Continued)

OTHER PUBLICATIONS

Machine translation of EP1775035A, 2007, 8 pages.

(Continued)

*Primary Examiner* — Douglas Lee

(57) ABSTRACT

A cooking range exhaust cleaning system includes a plurality of nozzles coupled to a conduit and arranged to spray a zone of a cooking range exhaust system with a cleaning solution, the zone corresponding to a hood zone, a flue zone, an exhaust fan zone, a waste collection system zone, or a combination thereof. As cleaning solution is carried through the conduit, as sensor senses its movement and a control box is configured to, in response to receipt of a signal to initiate a cleaning operation of the cooking range exhaust system, cause the cleaning solution to be provided to the plurality of nozzles via the conduit; collect a sensor reading from the sensor; and compare the sensor reading to a threshold. Other sensors of the system may include conduit sensors and vessel sensors.

20 Claims, 20 Drawing Sheets

(56) References Cited

U.S. PATENT DOCUMENTS

| | | | |
|---|---|---|---|
| 2013/0074823 A1 | 3/2013 | Kellogg et al. | |
| 2014/0076367 A1 | 3/2014 | Hung | |
| 2016/0030782 A1 | 2/2016 | Livchak et al. | |
| 2017/0008044 A1 | 1/2017 | Okumura et al. | |
| 2017/0225205 A1* | 8/2017 | Wellens | B08B 3/12 |
| 2019/0390859 A1* | 12/2019 | Lambertson | F24C 15/2057 |
| 2021/0123603 A1 | 4/2021 | Heo et al. | |
| 2022/0008968 A1 | 1/2022 | Haugen et al. | |
| 2022/0176400 A1* | 6/2022 | Schlenker | B05B 15/50 |
| 2022/0324000 A1* | 10/2022 | Shingler | B08B 3/02 |
| 2024/0238847 A1 | 7/2024 | Haugen et al. | |
| 2025/0296129 A1 | 9/2025 | Haugen et al. | |
| 2026/0027592 A1 | 1/2026 | Haugen et al. | |

FOREIGN PATENT DOCUMENTS

| | | |
|---|---|---|
| CN | 112146137 A | 12/2020 |
| CN | 113145517 A | 7/2021 |
| EP | 1775035 A1 | 4/2007 |
| GB | 2604887 A | 9/2022 |

OTHER PUBLICATIONS

Machine Translation of CN106765568A.
Machine Translation of CN108561916A.
Machine Translation of CN112146137A.
Machine translation of EP1775035A (2007).
International Search Report and Written Opinion dated Jan. 16, 2025 in connection with International Patent Application No. PCT/US2024/053899, 12 pages.
International Search Report and Written Opinion dated Jan. 17, 2024 in connection with International Patent Application No. PCT/US2024/053903, 21 pages.

* cited by examiner

RANGE EXHAUST CLEANING SYSTEMS AND METHODS USING DETECTION AND CONTROL

CROSS-REFERENCE TO RELATED APPLICATIONS

This application claims priority to and is a continuation-in-part to U.S. patent application Ser. No. 18/096,745, filed on Jan. 13, 2023 and entitled "SYSTEM AND METHOD TO CLEAN A RANGE EXHAUST", the entire contents of which are incorporated by reference herein in their entireties.

This application claims priority to U.S. Provisional Patent Application Ser. No. 63/547,728, filed on Nov. 8, 2023 and entitled "SYSTEM AND METHOD TO INTEGRATE AN EXHAUST FAN WITH AN AUTOMATED KITCHEN HOOD AND FLUE CLEANING SYSTEM", the entire contents of which are incorporated by reference herein in their entireties.

This application relates to U.S. Non-Provisional patent application Ser. No. 18/775,730, concurrently filed on Jul. 17, 2024 and entitled "SYSTEM AND METHOD TO INTEGRATE AN EXHAUST FAN WITH AN AUTOMATED KITCHEN HOOD AND FLUE CLEANING SYSTEM", which also claims priority to U.S. Provisional Patent Application Ser. No. 63/547,728, filed on Nov. 8, 2023 and entitled "SYSTEM AND METHOD TO INTEGRATE AN EXHAUST FAN WITH AN AUTOMATED KITCHEN HOOD AND FLUE CLEANING SYSTEM", the entire contents of which are incorporated by reference herein in their entireties.

BACKGROUND

Cooking ranges may have various types of exhaust systems (e.g., hood, backsplash, flue, connecting pipes or conduit, etc.) designed to exhaust cooking effluent (e.g., smoke, odors, grease, other types of cooking effluent, etc.) away from the cooking range. Over time, grease and other particles that are entrained in the exhaust effluent may be deposited on the surfaces of the exhaust system to form a film. This film may present a fire hazard, as it contains grease and other flammable materials from the cooking effluent. Manually scheduling cleaning of the film from the exhaust systems is not only costly and disruptive to restaurant operations but, can result in film build up between periodic cleanings, potentially leading to the aforementioned hazards.

SUMMARY

In view of the foregoing, cooking exhaust range cleaning systems of the present disclosure provide sensors to proactively identify problems that can impact the performance of the cleaning system.

In certain implementations, a cooking exhaust range cleaning system may include a plurality of nozzles coupled to a conduit and arranged to spray a zone of a cooking range exhaust system with a cleaning solution. The zone may correspond to a hood zone, a flue zone, an exhaust fan zone, a waste collection system zone, or a combination thereof. Movement of cleaning solution to the conduit may be sensed by a sensor, and a control box may be configured to, in response to receipt of a signal to initiate a cleaning operation of the cooking range exhaust system, cause the cleaning solution to be provided to the plurality of nozzles via the conduit; collect a sensor reading from the sensor; and compare the sensor reading to a threshold.

The sensor may be a pressure sensor or a flow rate sensor. The control box may be further configured to provide an alert in response to the comparison of the sensor reading to the threshold indicating at least one nozzle of the plurality of nozzles is at least partially clogged; may include a wired or wireless interface configured to provide data corresponding to the cleaning operation, and the data may correspond to the cleaning operation with the sensor reading or the sensor reading compared to the threshold.

In some aspects, the system may include a waste conduit configured to provide runoff from the cooking range exhaust system to a drain or reservoir. A waste conduit cleaning conduit may be configured to provide a second cleaning solution to the waste conduit. A second sensor may be configured to sense movement of cleaning solution to the waste conduit cleaning conduit. A control box may be configured to, in response to receipt of a second signal to initiate a second cleaning operation of the waste conduit, cause the cleaning solution to be provided to the waste conduit via the waste conduit cleaning conduit; collect a second sensor reading from the second sensor; and compare the second sensor reading to a second threshold.

In some additional or alternative aspects, the system may include the waste conduit, a second sensor configured to sense movement of fluid through the waste conduit, and the control box may be configured to: cause the runoff to be provided to the waste conduit; collect a second sensor reading from the second sensor; and compare the second sensor reading to a second threshold.

In certain aspects, the system may include the waste vessel configured to receive cleaning solution runoff from the cooking range exhaust system via a conduit. A second sensor may be configured to a level of fluid in the waste vessel, and the control box may be configured to: cause the cleaning solution runoff to be provided to the waste vessel; collect a second sensor reading from the second sensor; and compare the second sensor reading to a second threshold.

In other implementations, a method of using a cooking exhaust range cleaning system may involve: in response to receipt of a signal to initiate a cleaning operation of a cooking range exhaust system, causing a cleaning solution to be provided to at least one nozzle via a conduit, the at least one nozzle coupled to a conduit and configured to spray a zone of the cooking range exhaust system, the zone corresponding to a hood zone, a flue zone, an exhaust fan zone, a waste collection system, or a combination thereof; collecting a sensor reading from a sensor configured to sense movement of cleaning solution to the conduit; and comparing the sensor reading to a threshold.

The sensor reading may be a pressure reading or a flow rate reading. The method may involve proving an alert in response to the comparison of the sensor reading to the threshold indicating a nozzle of the at least one nozzle is at least partially clogged; and/or providing data corresponding to the cleaning operation to a remote device via a wired or wireless interface, and for instance the data may correspond to the cleaning operation comprises the sensor reading or the sensor reading compared to the threshold.

In some aspects, in response to receipt of a second start signal to initiate a second cleaning operation of a waste conduit configured to provide runoff from the cooking range exhaust system to a drain or reservoir, the method may involve causing the cleaning solution to be provided to the waste conduit via a waste conduit cleaning conduit; collecting a second sensor reading from a second senor configured to sense movement of cleaning solution to the waste conduit; and comparing the second sensor reading to a second threshold.

In some additional or alternative aspects, the method may involve causing cleaning solution runoff to be provided to a waste conduit; collecting a second sensor reading from a second sensor configured to sense movement of the cleaning solution runoff through the waste conduit; and comparing the second sensor reading to a second threshold.

In certain aspects, the method may involve causing cleaning solution runoff to be provided to a waste vessel; collecting a second sensor reading from a second sensor configured to a level of the cleaning solution runoff in the waste vessel; and comparing the second sensor reading to a second threshold.

In further implementations, at least one machine-readable medium including instructions that, when executed by processing circuitry, cause the processing circuitry to: cause a cleaning solution to be provided to a plurality of nozzles via a conduit, the plurality of nozzles configured to spray a hood, a flue, an exhaust fan, a waste collection system, or a combination thereof of a cooking range exhaust system; collect a sensor reading from a sensor configured to sense movement of cleaning solution to the conduit; and compare the sensor reading to a threshold.

The instructions may further cause the processing circuitry to provide an alert in response to the comparison of the sensor reading to the threshold indicating at least one nozzle of the plurality of nozzles is at least partially clogged.

The instructions may further cause the cleaning solution to be provided to another conduit separate from the conduit; a second sensor reading to be collected from a second senor configured to sense movement of cleaning solution through such another conduit; and the second sensor reading be compared to a second threshold. The instructions may further cause the processing circuitry to provide data corresponding to the cleaning operation to a remote device via a wired or wireless interface.

DETAILED DESCRIPTION

Figure 1A:
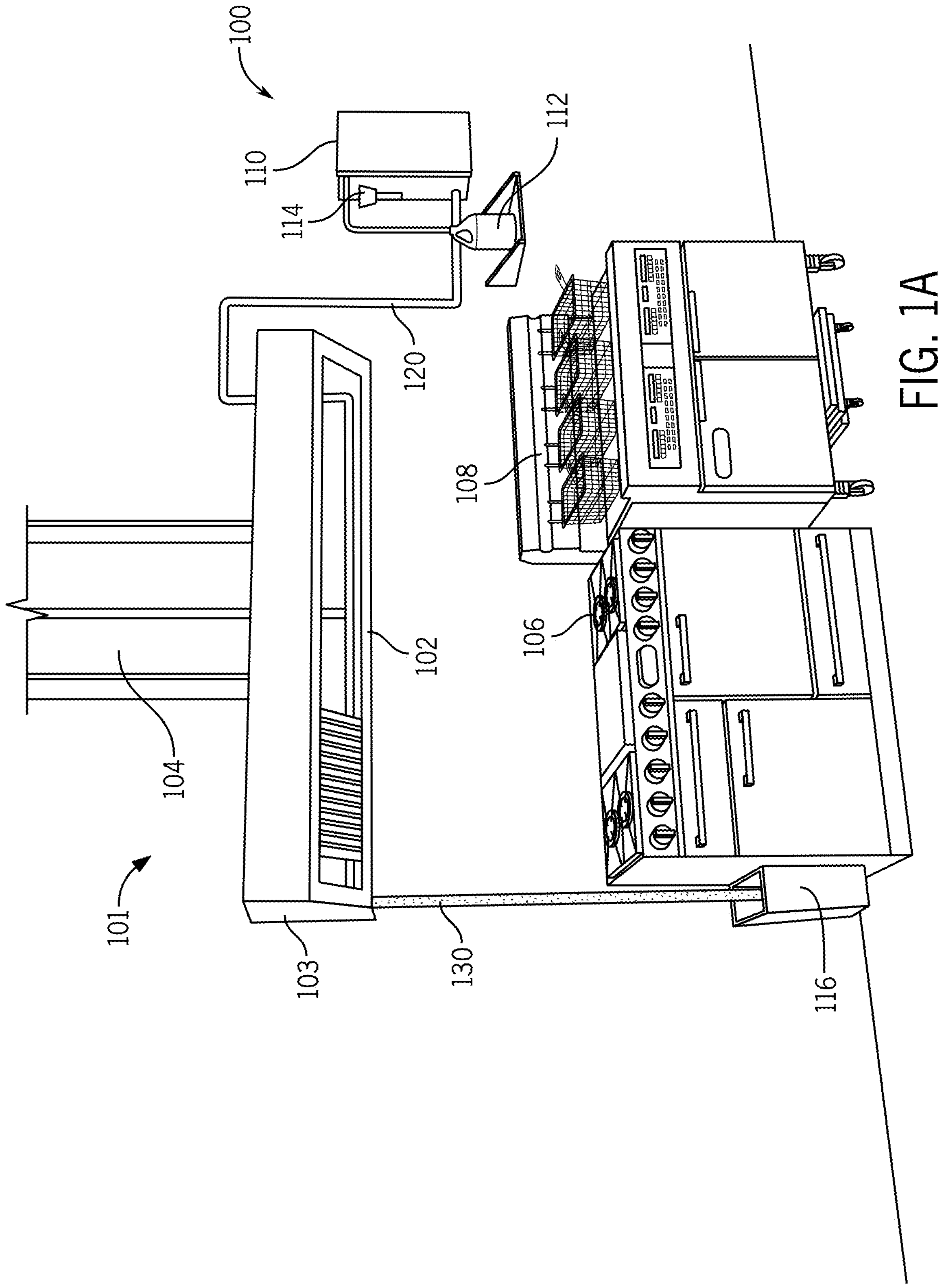
FIGS. 1A-1C depict diagrams illustrating an exemplary automated range exhaust cleaning system configured to clean deposited film from surfaces of a cooking range exhaust system according to implementations of the present disclosure.

Certain details are set forth below to provide a sufficient understanding of embodiments of the disclosure. It will be clear to one skilled in the art, however, that embodiments of the disclosure may be practiced without various aspects of these particular details. In some instances, well-known circuits, control signals, timing protocols, computer system components, and software operations have not been shown in detail in order to avoid unnecessarily obscuring the described embodiments of the disclosure.

Overview of Range Exhaust Cleaning System: This disclosure describes embodiments of an automated cooking range exhaust cleaning system (system) that may be configured to automatically clean the film from a cooking range exhaust system, as well as cleaning waste conduit and/or drain lines. As part of the cleaning process, the system may apply a selected degreasing solution or detergent.

In some embodiments, the automated cooking range exhaust cleaning system includes a spray system with conduit and nozzles disposed in the cooking range exhaust system and arranged to spray surfaces with a detergent solution and/or water. The spray or flush system may be divided into zones that are each independently activated or controlled.

The system may further include a control box that is configured to control operation of the spray system, including cleaning operation parameters or configurations for individual zones. The control box may control, on a zone-by-zone basis, scheduling cleaning operations (e.g., frequency and times), a duration of a cleaning cycle, a detergent or combination of detergents, a mixing ratio of the selected detergent or combination of detergents, number of spray or flush cycles per cleaning operation, duration of individual spray or flush cycles. The control box may further be configured to monitor nozzle operations and nozzle operation status, conduit operations and conduit operation status, reservoir operation and reservoir status, drain operation and drain status, and the operation and status of other cleaning and cleaning waste management operations of the range exhaust system. In some examples, the control box may include a wireless interface (e.g., Wi-Fi, Bluetooth, etc.) for providing cleaning operation data, receiving threshold sensor values, receiving sensor values, providing and receiving completed or missed cleaning cycles, receiving configuration settings, receiving nozzle threshold sensor values, providing nozzle operation instructions, providing nozzle operation status, receiving conduit threshold sensor values, providing conduit operation instructions, providing conduit operation status, providing status information (e.g., online or offline, faults or errors, etc.), etc., or any combination thereof. The control box may interface with an electronic device (e.g., a smartphone, tablet, any other computing or electronic device, etc.) via the wireless interface. Additionally or alternatively, the control box may include a wired interface for providing cleaning operation data, completed or missed cleaning cycles, receiving configuration settings, receiving nozzle threshold sensor values, providing nozzle operation, providing nozzle operation status, receiving conduit threshold sensor values, providing conduit operation instructions, providing conduit operation status, providing status information (e.g., online or offline, faults or errors, etc.), etc., or any combination thereof. Thus, the wireless and/or wired interface may facilitate configuration of the control box to control operation of the automated range cleaning system according to specified settings.

The control box may control output devices, such as switches, solenoids, pumps, water and detergent pumps, valves, etc. The control box may further monitor various input devices, such as input from sensors, including: timing sensors, flow sensors (e.g., flow meters), pressure sensors, float sensors (e.g., float switches), ultrasonic sensors, capacitance sensors, conductance sensors, optical sensors, nozzle sensors, hood sensors, flue sensors, fan sensors, conduit sensors, drain sensors, drain line sensors; and input from timers, cancel/abort input signals, etc. In some examples, the control box may include a microcontroller and a memory that is programmed with instructions to control or perform methods or operation described herein. In some examples, the control box includes a programmable logic controller (PLC) or a control board configured to be programmed to control or perform methods or operations described herein.

In some examples, the control box may monitor one or more float switches from a set of float switches in real time before the cleaning operation. Float switches may be arranged at a mixing station where water and detergent are mixed prior to dispensing during a cleaning operation. Accordingly, float switch monitoring may be used to determine how much volume of a detergent or combination of detergents needs to be added by a detergent pump to meet the desired detergent and water mixing ratio. Float switches may be actuated by incoming water from the water supply as it fills a reservoir. The control box may set a different mixing ratio for each individual spray during the cleaning operation.

In other examples, the control box may implement a post-mix operation such that a mixing ratio is controlled via a set of electronically controlled valves to meter the water supply and the detergent such that they are mixed at the point they enter the conduit according to a target mixing ratio. The control box may control the set of valves to independently select a detergent or combination of detergents and a mixing ratio of the selected detergent or combination of detergents for each individual zone.

In some examples, the control box initiates a cleaning operation on a zone-by-zone basis. In some examples, the control box is limited to causing one zone to be cleaned at a time, with one or more of the zones cleaned sequentially. That is, once a cleaning operation with one zone is complete, the control box may initiate a cleaning operation on a second zone according to a cleaning schedule, and once the cleaning operation for the second zone complete, a cleaning operation for a third zone (if applicable) may be initiated. In other examples, two or more zones may be cleaned contemporaneously. In some examples, two zones with common target detergent-to-water ratios may be cleaned contemporaneously. A determination of a number of zones capable of being cleaned contemporaneously may be based available supply water volume and pressure, pump capacity, duration of the cleaning operation, and cleaning solution (e.g., water and detergent mixture) volume and pressure for selected zones.

The respective cleaning operation for each zone may be individually configured independent of other zones. For example, for a single cleaning operation of a particular zone, the control box may be programmed to specify number of spray cycles, a duration of each spray or flush cycle, a detergent or combination of detergents, a mixing ratio of the selected detergent or combination of detergents and water, a number of and duration of each water rinse spray cycle, or any combination thereof. The control box may be further programmed to specify a schedule for a particular cleaning operation in each zone.

In some examples, the cleaning system may include sensors (e.g., cameras or other sensors capable of detecting the film on the surfaces of the exhaust system. In some examples, the control box may periodically receive data from the sensors indicating a level of film deposit and may determine whether to schedule a cleaning operation based on the data. In some examples, rather than being purely time-based, the control box may end a cleaning operation in response to data from the sensors indicating that the surfaces of the exhaust system are sufficiently clean. In some examples, the control box may determine whether a completed cleaning operation was successful based on the data from the sensors. In some examples, the control box may provide the sensor data to a backend system to be analyzed and stored.

In some examples, the cleaning system may include one or more sensors configured for monitoring performance of the range exhaust cleaning system such as nozzles, conduits carrying cleaning solution and/or water, for monitoring the performance of a waste collection system of the cleaning system such as waste collection conduits and vessels carrying cleaning waste, e.g., cleaning solution runoff, and for monitoring the performance of the components cleaned such as a range hood, flue, and exhaust fan. Sensors configured to sense the flow or presence of cleaning fluid (including cleaning fluid to be dispensed as well as collected cleaning fluid after dispensing) may be arranged throughout the range exhaust system, such as in or at nozzles, hoods, flues, fans, conduits, drains, and so on, and these sensors may be referred to as nozzle sensors, conduit sensors, vessel sensors, hood sensors, flue sensors, fan sensors, drain sensors, drain line sensors, and so on.

Accordingly, the cleaning system may include one or more sensors configured for monitoring performance of the nozzles, referred to as a nozzle sensor or nozzle sensors. In some examples, the nozzle sensor is a pressure sensor. In some examples, the nozzle sensor is a flow rate sensor. However, the nozzle sensor may be any type of sensor disclosed herein. The control box may receive nozzle sensor data from the nozzle sensor when the cleaning system is performing a cleaning operation. In some examples, the control box may be configured to determine whether nozzles are partially or fully clogged based on the data from the nozzle sensor and a threshold sensor value. In some examples, the control box may provide the nozzle sensor data to a backend system to be analyzed and stored.

In some examples, the cleaning system may include one or more conduit sensors for monitoring performance of the conduits, such as conduits configured for carrying detergent and/or water to locations other than a nozzle outlet, e.g., to a waste conduit and/or to another conduit configured for carrying detergent and/or water to a vessel such as a waste reservoir. In some examples, the conduit sensor is a pressure sensor. In some examples, the conduit sensor is a flow rate sensor. However, the conduit sensor may be any type of sensor disclosed herein. The control box may receive conduit sensor data from the conduit sensor when the cleaning system is performing a cleaning operation. In some examples, the control box may be configured to determine whether a conduit is, or conduits are, partially or fully clogged based on the data from the conduit sensor(s) and a threshold sensor value. In some examples, the control box may provide the conduit sensor data to a backend system to be analyzed and stored. The conduit sensor may be a sensor that is separate from the nozzle sensor.

In some examples, the cleaning system may include one or more sensors to monitor the waste collection system thereof, which may be used to determine whether buildup of cleaning waste (e.g., cleaning solution runoff) is present in the waste collection system. The waste collection system may include waste collection components of the cleaning systems such as a waste reservoir, waste conduit, trough, sloped floor, nozzles, and so on. For instance, vessel sensors may be used to monitor the performance of the vessels, such as waste collection vessels of the waste collection system, e.g., waste reservoirs and troughs, configured to collect waste from cleaning operations that remove cooking film and buildup from the range exhaust system and to distribute or empty the collected waste to a floor drain (or other common drain). Vessel sensors may be float sensors (e.g., float switches) and may be used to determine whether buildup of cleaning waste is present in the vessels. Float sensors may be actuated by a buildup of cleaning waste as it fills the vessel or other portion of the waste collection system. Nozzle sensors may be used to detect whether a nozzle of the waste collection system (e.g., a nozzle in a trough of a hood) is occluded or partially occluded. Drain sensors such as flow rate sensors may be used to determine whether a drain conduit or drain line is clogged or partially clogged. Accordingly, the control box may determine when vessels, conduits, drains, ports and other portions of the waste collection system require cleaning or service. For instance, the control box may be configured to provide an alert in response to the comparison of the float switch and/or drain sensor reading to a corresponding threshold indicating the vessel is over-filling or at risk of over-filling or if the drain is clogged or partially clogged. The sensors of the waste collection system may include any sensor of the present disclosure.

In some examples, the cleaning system may include one or more hood sensors, flue sensors, fan sensors, and so on, for monitoring performance of respective components of the cleaning system and of the components cleaned by the cleaning system. Such sensors may have any sensor configuration type disclosed herein, e.g., flow, pressure, float, ultrasonic, capacitance, conductance, optical, and so on. The various nozzle, conduit, vessel, hood, flue, fan, drain sensors may be separate from one another.

The control box may be configured to provide data related to operation of the automated cooking range exhaust cleaning system, such as cycles completed, cycle duration, amount of detergent used, sensed film deposit data, nozzle operation, nozzle operation status, conduit operation, conduit operation status, hood operation, hood status, flue operation flue status, fan operation, fan status, waste collection system operation, waste collection system status, etc., or any combination thereof. The information may be stored in a database. The database may also include inspection data that indicates whether the cleaning operations are meeting expected standards. The database may provide alerts if cleaning operations need to be adjusted for not meeting expected standards. The database may also provide alerts if received data indicates that operation of a particular automated cooking range exhaust cleaning system or waste collection system is not as expected, such as missing scheduled cleaning operations, duration of an operation is not as expected, more or less detergent is being used than expected, etc., or any combination thereof. The database may also provide alerts if a threshold sensor value is reached. For instance, the database may provide alerts if the nozzle operation reaches a threshold sensor value, indicating the threshold number of nozzles are partially or fully clogged. In another example, the database may provide a nozzle operation status, which indicates or estimates how many nozzles are clogged. The nozzle operation status may be provided before the number or estimated number of clogged nozzles reaches the threshold sensor value to trigger an alert. In another example, the nozzle operation status will periodically be provided, such as when the cleaning operation is running, regardless of whether the threshold sensor value is reached.

The database may also provide alerts if the conduit operation reaches a threshold sensor value, indicating the threshold level of a conduit or conduits is partially or fully clogged. In another example, the database may provide a conduit operation status, which indicates or estimates the level of clogging. The conduit operation status may be provided before the threshold sensor value is reached to trigger an alert. In another example, the conduit operation status will periodically be provided, such as when the cleaning operation is running, regardless of whether the threshold sensor value is reached. The conduits may be fluidly coupled to a system pump and receive pumped fluid, or may not be coupled to a pump and may instead receive fluid from the cleaning system after a cleaning operation, e.g., the fluid may be cleaning waste containing a mixture of sprayed fluid and removed cooking grease.

The database may additionally or alternatively provide alerts if a vessel such as a waste collection vessel reaches a threshold sensor value, indicating the threshold level of cooking and/or cleaning waste has built up in the vessel, e.g., due to a related conduit or vessel port being partially or fully clogged. In another example, the database may provide a vessel operation status, which indicates or estimates the level of cleaning waste in the vessel. The vessel operation status may be provided before the threshold sensor value is reached to trigger an alert. In another example, the vessel operation status will periodically be provided, such as when the cleaning operation is running, regardless of whether the threshold sensor value is reached.

Moreover, the database may additionally or alternatively provide alerts if the hood sensors, flue sensors, fan sensors, drain sensors, drain line sensors, and so on, reaches a threshold sensor value, indicating the threshold level of clogging and/or buildup of cooking and/or cleaning waste. The database may provide an operation status of the flue, fan, drain and so on, which indicates or estimates the level of cleaning waste or cooking buildup. The operation status may be provided before the threshold sensor value is reached to trigger an alert. In another example, the operation status will periodically be provided, such as when the cleaning operation is running, regardless of whether the threshold sensor value is reached.

Further, the database may additionally or alternatively provide alerts if the sensors detect an anomaly or breakdown in hood operation, hood status, flue operation flue status, fan operation, fan status. For instance, if the sensors detect one or more of the hood, flue or fan are non-operational, the database may provide an alert that the cleaning operation(s) should be stopped or modified.

Accordingly, aspects of the present disclosure provide nozzle sensors to proactively identify clogged nozzles, conduit sensors to proactively identify clogged conduits, waste collection system sensors to proactively identify buildup of cleaning waste, and other sensors disclosed herein to proactively identify problems that can impact the performance of the cleaning system. The sensors may be configured to sense movement of cleaning solution, e.g., to a conduit employing one or more cleaning nozzles, such as a hood conduit, flue conduit, or fan conduit. These sensors may be pressure sensors, flow rate sensors, or any sensor of the present disclosure. Based on changes in the sensor readings, the system can identify when clogging or buildup is occurring, such as when nozzles are clogged, how many nozzles are clogged, when conduits are clogged, and the level of clogging, when a waste collection vessel has a buildup of cleaning waste or a level of cleaning waste. The nozzle sensor, the conduit sensor, and the vessel sensor may be separate from one another. When both a nozzle sensor and a conduit sensor are employed, one or both of these sensors may be positioned proximal a pump that provides cleaning solution to the nozzles. Alternatively, one of these sensors may be positioned downstream from the other sensor. For instance, the nozzle sensor may be positioned proximal to a cleaning solution pump, while the conduit sensor may be positioned downstream of nozzles in the system and configured to sense fluid characteristics (e.g., fluid flow or pressure) of fluid flowing through a conduit for dispensing from a downstream outlet orifice having an orifice area. When a waste collection system sensor is provided, the sensor may be configured to sense the presence of cleaning waste which may be a mixture of cleaning solution and removed cooking film. A sensor of the waste collection system may in some cases be a sensor coupled to a component of the waste collection system at a location downstream of a nozzle outlet or other orifice of the cleaning system that dispenses cleaning fluid, and thus the sensor may be configured to sense the presence of fluid or flow of fluid that flows by gravity as opposed to being pumped via a positive displacement pump.

Outlet orifices according to the present disclosure differ from nozzles in that nozzles generally spray fluid from a nozzle outlet, while outlet orifices dispense fluid to another conduit or from an outlet orifice into to a waste receptacle. Nozzles of the present disclosure enable liquid to be dispensed via a nozzle orifice designed to deliver a specific spray pattern upon actuation of the pump. These spray patterns and position of the nozzle facilitate delivery of the cleaning solution to cover a target area of the hood, e.g., an effected or entire area of the hood, flue and/or fan. Consequently, clogging of these nozzles and fluid lines leading thereto changes the spray pattern and reduces the area where grease film can be actively cleaned or removed.

The sensors of the present disclosure may provide sensor data to the database and the database may analyze the sensor data. The database may trigger an alarm when the sensor reading reaches a threshold sensor value, indicating poor operation of the cleaning system components, e.g., nozzle(s), conduit(s), vessel(s). The threshold sensor value may indicate a designated number of nozzles, conduits and/or vessels are clogged, or partially clogged. The database may provide operation status, which may indicate how many nozzles, conduits and/or vessels are clogged or an overall clog rate of these system components or the overall system (e.g., of nozzles and conduits and vessels), regardless of whether an alert is triggered.

Overview of Range Exhaust Fan Cleaning System: Another embodiment of the disclosure describes integration of an externally mounted kitchen exhaust fan (exhaust fan) with an automated range exhaust cleaning system and a method for including such an exhaust fan as part of an automated cleaning process. Specific design elements for the fan may include spray nozzles positioned within the housing of the exhaust fan that are targeted to clean key elements of the exhaust fan while minimizing electrical and corrosive impact on the exhaust fan, integrated plumbing and operational or coordinated control with a remotely located chemical dispenser that is part of the automated range exhaust cleaning system, and elements to enable easy service and cleaning of the exhaust fan.

An automated range exhaust cleaning system may be configured to automatically clean the film from a cooking range exhaust system (e.g., system configured to remove steam, smoke, and other airborne contaminants generated while using various kitchen appliances), as well as clean waste conduit and/or drain lines. As part of the cleaning process, the automated range exhaust cleaning system may apply a selected degreasing solution or detergent. Because an exhaust fan is implemented to pull steam and smoke entrained with grease and other contaminants up through the hood and flue, it too may develop a similar film may also be contaminated with similar film material, as well as may be contaminated by external environmental contamination by virtue of being placed outdoors and exposed to natural elements. Thus, integration of the exhaust fan into the automated range exhaust cleaning system may increase efficiency and frequency in an ability to clean the exhaust fan (e.g., the fan blades, fan shaft, motor housing, fan housing, etc.) as compared with externally mounted exhaust fans that require manual cleaning.

In some examples, the exhaust fan cleaning system may include a waste collection system that is configured to cause deposited cleaning solution and flush water to be collected and directed to a drain system of the cleaning system or a separate drain system individual to the fan.

In some examples, the exhaust fan may include a separate exhaust fan control box configured to communicate (using wired or wireless communication) with the control box of the automated range exhaust cleaning system, such as to control operation of the fan during a cleaning operation (e.g., cut or modify power and/or establish power), to initiate a cleaning operation on the fan (e.g., by the exhaust fan control box or by the cleaning system control box), to report power status of or an issue with the fan, etc. In other examples, control of the exhaust fan may be integrated with the control box of the automated range exhaust cleaning system.

In some examples, the exhaust fan may include sensors such as one or more nozzle sensors, conduit sensors, float sensors, ultrasonic sensors, capacitance sensors, conductance sensors, and optical sensors and other sensors (e.g., current/power, torque, vibration, etc., sensors (indicating operating conditions of the exhaust fan), or other sensors capable of detecting the film on the surfaces of the exhaust fan). In some examples, the exhaust fan control box of the exhaust fan or the cleaning system control box of the automated range exhaust cleaning system may periodically receive data from the sensors indicating a level of film deposit and/or a level of cleaning waste buildup, and may determine whether to schedule or initiate a cleaning operation based on the data. In some examples, rather than being purely time-based, either control box may end a cleaning operation in response to data from the sensors indicating that the surfaces of the exhaust fan are sufficiently clean.

Sensors of the exhaust fan cleaning system may be configured for monitoring performance of the operation of the cleaning system and of the exhaust fan. Nozzle sensors of the exhaust fan cleaning system may be configured for monitoring performance of the nozzles of the exhaust fan. In some examples, the nozzle sensor is a pressure sensor. In some examples, the nozzle sensor is a flow rate sensor. The nozzle sensors may also be configured as any of the sensors disclosed herein, e.g., ultrasonic sensors, capacitance sensors, conductance sensors, optical sensors, and so on. The exhaust fan control box or the cleaning system control box may receive nozzle sensor data from the nozzle sensor when the cleaning system is performing a cleaning operation. In some examples, the exhaust fan control box or the cleaning system control box may determine whether one or more nozzles are partially or fully clogged based on the data from the nozzle sensor and a threshold sensor value. In some examples, the exhaust fan control box or the cleaning system control box may provide the nozzle sensor data to a backend system to be analyzed and stored. Conduit sensors of the exhaust fan cleaning system may be configured for monitoring performance of the conduits of the exhaust fan, as provided herein. The conduit sensors may be configured as pressure sensors, flow rate sensors, ultrasonic sensors, capacitance sensors, conductance sensors, optical sensors, and so on. Vessel sensors of the exhaust fan cleaning system may be configured for monitoring buildup of film and/or cleaning waste, as provided herein. The waste collection system sensors, e.g., nozzle sensors, conduit sensors, vessel sensors and drain sensors may include pressure sensors, flow rate sensors, float sensors (e.g., float switches), optical sensors, ultrasonic sensors, capacitance sensors, conductance sensors and so on.

Either control box may be configured to provide data related to operation of the automated range exhaust cleaning system, such as cycles completed, cycle duration, amount of detergent used, sensed film deposit data, nozzle operation, nozzle operation status, conduit operation, conduit operation status, vessel operation, vessel operation status, etc., or any combination thereof. The information may be stored in a database. The database may also include inspection data that indicates whether the cleaning operations are meeting expected standards. The database may provide alerts if cleaning operations need to be adjusted for not meeting expected standards. The database may also provide alerts if received data indicates that operation of a particular automated cooking range exhaust cleaning system is not as expected, such as missing scheduled cleaning operations, duration of an operation is not as expected, more or less detergent is being used than expected, etc., or any combination thereof. The database may also provide alerts if a threshold sensor value is reached, for instance indicating the threshold number of nozzles are clogged, a threshold level of the conduit is clogged, or a threshold level of a vessel is full. In another example, the database may provide a nozzle, conduit or vessel operation status, which indicates how many nozzles are clogged, how much of a conduit is clogged, or the liquid level of the vessel. The operation status may be provided before the threshold sensor value is reached to trigger an alert. In another example, the operation status will periodically be provided, such as when the cleaning operation is running, regardless of whether the threshold sensor value is reached.

The various embodiments described herein are aimed at automatically cleaning hood systems and include directing cleaning solutions to hoods, flues, and exhaust fans through spray nozzles and conduits and collecting the dispensed cleaning fluid and cleaning waste. But, if spray nozzles and/or conduits become clogged and cannot spray or deliver cleaning solution onto the system, the system may not as effectively clean hoods, flues, and exhaust fans, and may cause grease build up. Such grease build up may require labor intensive manual cleaning. Often, nozzles and conduits are in hard to reach or hard to see locations, and identification of clogged nozzles and/or conduits (e.g., at their outlets) requires visual inspection, which may occur during periodic inspections. During the inspection, the clogged and/or conduits nozzle may be identified by the grease build up caused by poor cleaning. While periodic inspections for these types of systems is common to ensure proper operation and safety, time, labor, and money can be saved if the system is proactive in identifying potential risk of grease build up.

Figure 1B:
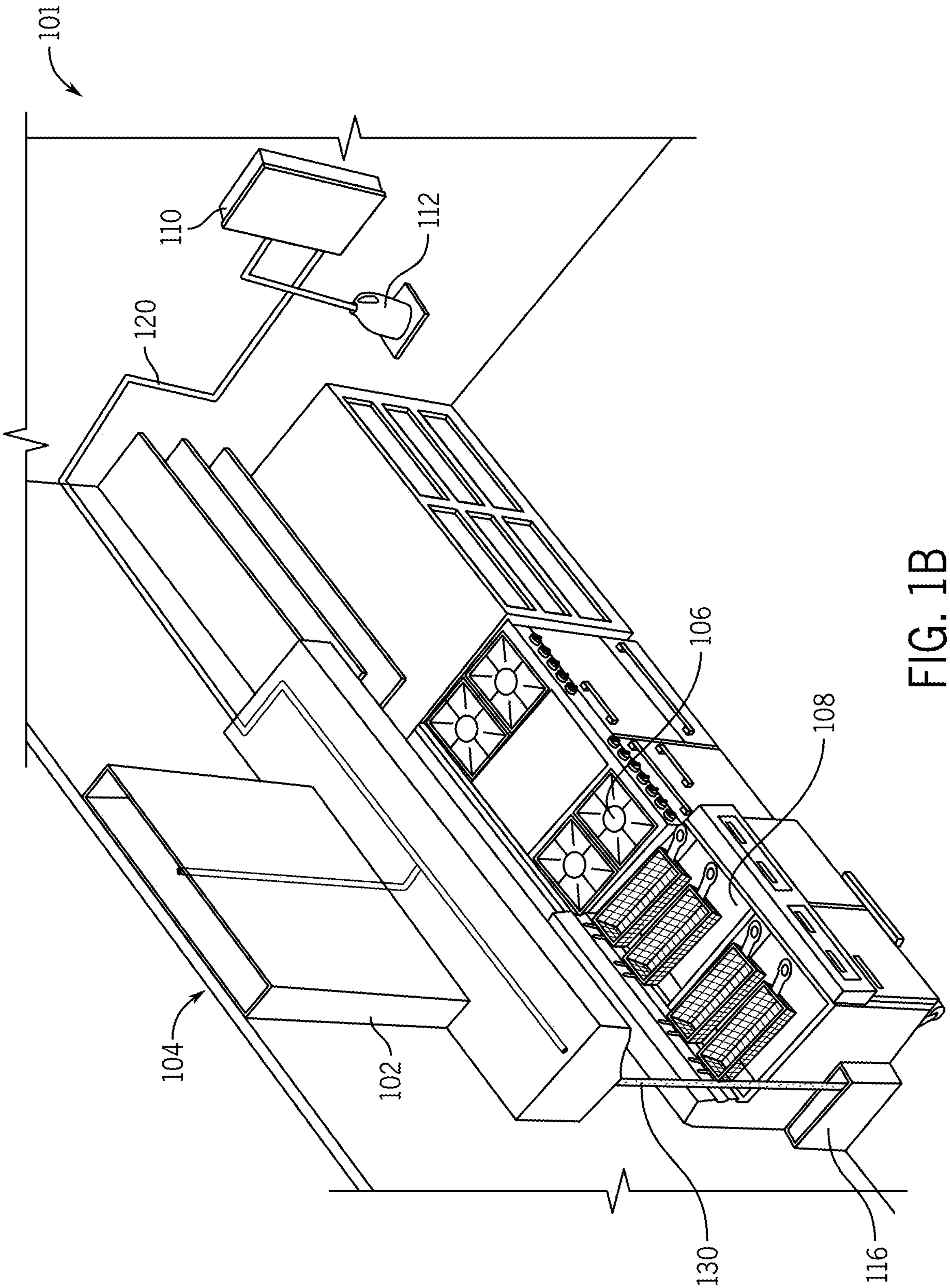
Figure 1C:
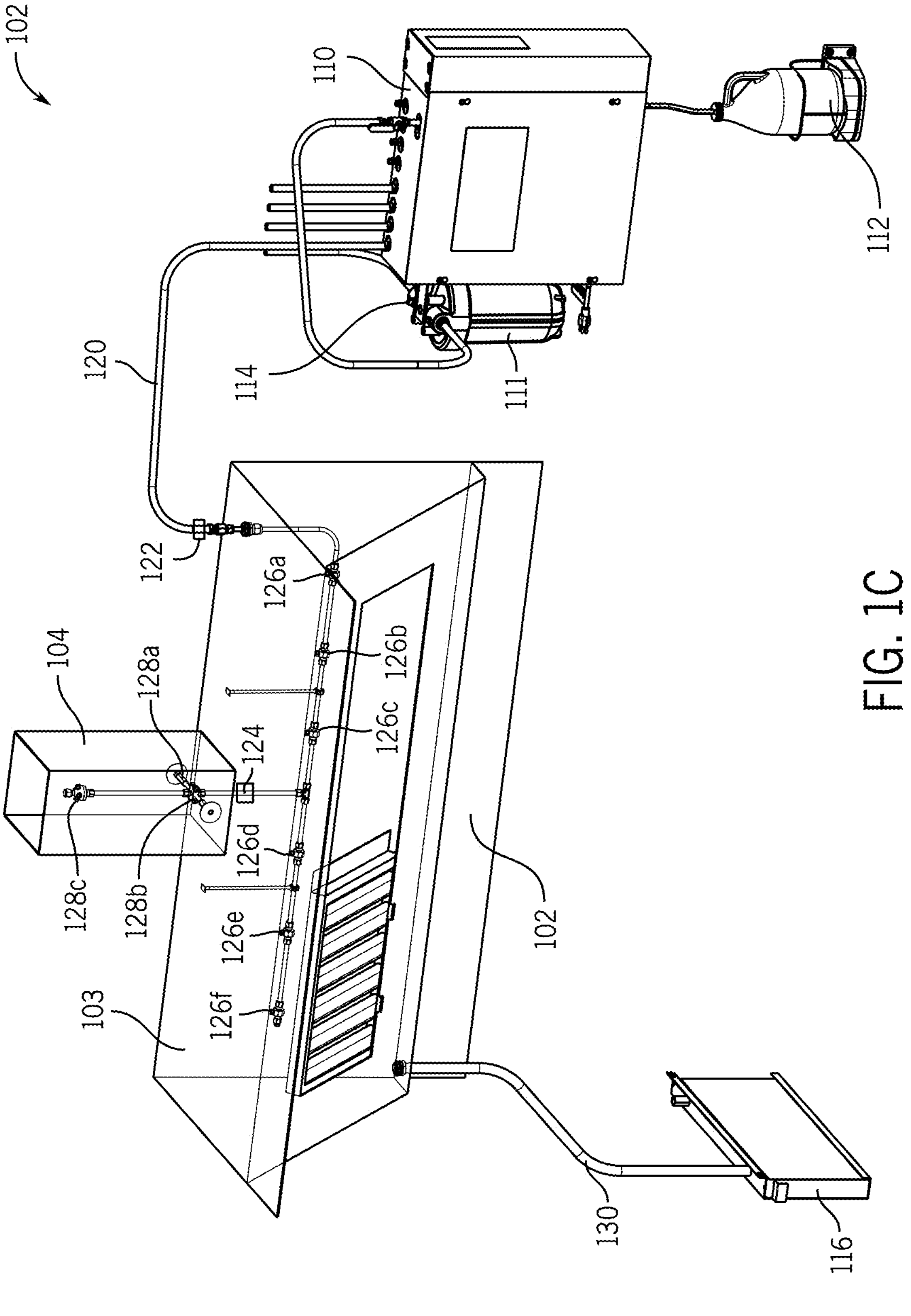

Turning to the Figures, FIGS. 1A-1C depict diagrams illustrating an exemplary automated range exhaust cleaning system 100 configured to clean deposited film from surfaces of a cooking range exhaust system 101 (e.g., including a backsplash 102, a hood 103, a flue 104, and any connecting pipes or conduit) in accordance with embodiments of the disclosure. The system 100 includes a control box 110, a detergent supply 112, a water supply inlet 114, a waste reservoir 116, a conduit 120, conduit sensors 122, 124, and nozzles 126*a*-126*f*, 128*a*-128*c*. The cooking range exhaust system 101 may remove or exhaust cooking effluent (e.g., smoke, odors, grease, other types of cooking effluent, etc.) away from a cooking range 106 and/or a fryer 108. Over time, grease and other particles that are entrained in the exhaust effluent may be deposited on the surfaces of the backsplash 102, the hood 103, the flue 104, etc. to form a film. The system 100 may be configured to automatically clean the film from the cooking range exhaust system 101, which may include application of a degreasing or cleaning solution. In some examples, the system 100 is only configured to clean inside surfaces of the cooking range exhaust system 101 (e.g., inside of the hood 103 and the flue 104, but not the outside of the hood 103 or the flue 104, filters; or the backsplash 102).

In some embodiments, the system 100 includes a spray system with conduit 120 disposed in, on, or proximate to parts of the cooking range exhaust system 101, the hood 103 and/or the flue 104, and may be arranged to spray surfaces with a detergent solution and/or water. In some examples, the conduit 120 may include two or more zones of independently activated or controlled groups of nozzles. In some examples, the zones may each have an independent set of pipes. In other examples, the zones may share some pipes with other zones, yet the nozzles are independently activated or controlled. In some examples, the conduit 120 is fluidly connected to nozzles 126*a*-126*f* and 128*a*-128*c* (FIG. 1C). In some examples, nozzles 126*a*-126*f* are associated with a first zone (e.g., a hood zone, an exhaust fan zone, a waste collection system zone, and/or a flue zone), while nozzles 128*a*-128*c* are associated with a second zone (e.g., a different one or more of the hood zone, exhaust fan zone, waste collection system zone, and/or a flue zone). In some examples, each zone may be associated with one of, or a plurality of: a hood, flue, exhaust fan, and/or waste reservoir.

The control box 110 may be configured to control operation of the system 100, including cleaning operation parameters or configurations for individual zones of the conduit 120. The control box 110 may receive water at a water supply inlet 114. The water supply inlet 114 may include a filter to filter the supply water prior to entering the system 100. The control box 110 may also receive detergent from a detergent supply 112. The control box 110 may be programmed to control, on a zone-by-zone basis, scheduling cleaning operations (e.g., frequency and times), a duration of a cleaning cycle, detergent-to-water ratios, number of spray cycles per cleaning operation, duration of individual spray cycles, or any combination thereof. In some examples, the control box 110 may include a wireless interface (e.g., Wi-Fi, Bluetooth, etc.) for providing cleaning operation data, completed or missed cleaning cycles, receiving configuration settings, receiving nozzle threshold sensor values, providing nozzle operation instructions, providing nozzle operation status, receiving conduit sensor values, providing conduit operation instructions, providing conduit operation status, receiving waste collection system sensor values, providing waste collection system instructions, providing waste collection system operation status, providing status information (e.g., online or offline, faults or errors, etc.), etc., or any combination thereof. The control box 110 may interface with an electronic device (e.g., a smartphone, tablet, any other computing or electronic device, etc.) via the wireless interface. Additionally or alternatively, the control box 110 may include a wired interface for providing cleaning operation data, completed or missed cleaning cycles, receiving configuration settings, receiving nozzle threshold sensor values, providing nozzle operation, providing nozzle operation status, providing status information (e.g., online or offline, faults or errors, etc.), etc., or any combination thereof. Thus, the wireless and/or wired interface may facilitate configuration of the control box 110 to control operation of the system 100 according to specified settings.

The spent cleaning solution and film debris removed from the cooking range exhaust system 101 may drain via a waste conduit 130 to a waste reservoir 116 of a waste collection system, which may be emptied as necessary. In some examples, a conduit sensor may be coupled to a conduit leading to the waste conduit 130 or may be coupled to the waste conduit 130 and may be configured to sense fluid characteristics of the fluid flowing through the waste conduit, as provided further herein. In some examples, the waste conduit 130 may connect directly to a common drain (e.g., rather than to the waste reservoir 116) configured to receive other wastewater from the kitchen operations.

The control box 110 may control output devices, such as, solenoids, water, detergent and cleaning solution pumps, valves, etc. The control box 110 may further monitor various input devices, such as timing sensors, timers, cancel/abort input signals, float switches, nozzle operation sensors, etc. In some examples, the control box 110 may include a microcontroller and a memory that is programmed with instructions to control or perform methods or operation described herein. In some examples, the control box 110 includes a programmable logic controller (PLC) configured to be programmed to control or perform methods or operations described herein.

In some examples, the control box 110 may monitor one or more float switches from a set of float switches in real time before the cleaning operation to determine how much volume of detergent from the detergent supply 112 needs to be added by a detergent pump to meet the desired detergent and water mixing ratio. The float switches may be actuated by incoming water from the water supply 114. The control box 110 may cause the detergent to be pumped from the detergent supply 112 to a reservoir attached to the control box 110. The control box 110 may select a different detergent or combination of detergents, and/or a different mixing ratio for each individual spray during the cleaning operation.

In other examples, the control box 110 may implement a post-mix operation such that a mixing ratio is controlled via a set of electronically controlled valves to meter the water supply and the detergent supply 112 such that they are mixed at the point they enter the conduit 120 according to a target mixing ratio. The control box 110 may control the set of valves to independently set a mixing ratio for each individual zone.

In some examples, the control box 110 initiates a cleaning operation on a zone-by-zone basis. In some examples, the control box 110 is limited to causing one zone to be cleaned at a time, with one or more of the zones cleaned sequentially. That is, once a cleaning operation with one zone is complete, the control box 110 may initiate a cleaning operation on a second zone according to a cleaning schedule, and once the cleaning operation for the second zone complete, a cleaning operation for a third zone (if applicable) may be initiated. The process may continue to repeat for fourth, fifth, etc. zones. The control 110 may support programming to clean any number of different zones of a cooking range exhaust system 101, such as 4, 5, 6, 7, 8, or more zones. In other examples, two or more zones may be cleaned contemporaneously. In some examples, two zones with common target detergent-to-water ratios may be cleaned contemporaneously. A determination of a number of zones capable of being cleaned contemporaneously may be based available supply water volume and pressure, pump capacity, duration of the cleaning operation, and cleaning solution (e.g., water and detergent mixture) volume and pressure for selected zones. In some examples, one or more hood zones, one or more flue zones, one or more exhaust fan zones, and one or more waste collection system zones may be provided. Each of the zones may include one or more nozzles or orifice outlets. For instance, each of the aforementioned zones may include at least one nozzle and/or each of the aforementioned zones may include at least one conduit.

The respective cleaning operation for each zone may be individually configured independent of other zones. For example, for a single cleaning operation of a particular zone, the control box may be programmed to specify number of spray cycles, a duration of each spray cycle, a detergent or combination of detergents, a mixing ratio of the selected detergent or combination of detergents and/or water, a number of and duration of each water rinse spray cycle, or any combination thereof. The control box 110 may be further programmed to specify a schedule for a particular cleaning operation in each zone, such as specifying performance of cleaning operations on specific days, excluding cleaning operation on specific days, scheduling cleaning operations after a set number of days or weeks, etc., or any combination thereof.

In some examples, the system 100 may include sensors (e.g., cameras or other sensors) (not shown) capable of detecting the film on the surfaces of the cooking range exhaust system 101. In some examples, the control box 110 may periodically receive data from the sensors indicating a level of film deposit and may determine whether to schedule a cleaning operation based on the data. In some examples, rather than being purely time-based, the control box 110 may end a cleaning operation in response to data from the sensors indicating that the surfaces of the cooking range exhaust system 101 are sufficiently clean. In some examples, the control box 110 may determine whether a completed cleaning operation was successful based on the data from the sensors. In some examples, the control box 110 may provide the sensor data to a backend system to be analyzed and stored.

The system 100 may include one or more sensors communicatively coupled to the control box 110 for monitoring performance of the cleaning system. In some examples, the system 100 may include one or more nozzle sensors 122, 124 for monitoring performance of the nozzles. In some examples, the nozzle sensors 122, 124 are pressure sensors. In some examples, the nozzle sensors 122, 124 are flow rate sensors. The control box 110 may receive nozzle sensor data from the nozzle sensors 122, 124 when the system 100 is performing a cleaning operation. In some examples, the control box 110 may determine whether any nozzles are clogged based on the data from the nozzle sensors 122, 124 and a threshold sensor value. In some examples, the control box 110 may provide the nozzle sensor data to a backend system to be analyzed and stored. In some examples, the nozzle sensor 122 are coupled to the conduit 120 in a location downstream of the pump 111 of the control box 110 and upstream of the nozzles in the hood 103 and/or flue 104. For instance, as shown in FIG. 1C, the nozzle sensor 122 is coupled to the conduit 120 downstream from the pump 111 of the control box 110 and upstream of the nozzles or nozzle groupings 126*a*-126*f* in the hood 103. As also shown in FIG. 1C, the nozzle sensor 124 is coupled to the conduit 120 between the hood 103 and flue 104 and upstream of the nozzles or nozzle groupings 128*a*-128*c* arranged in the flue 104. The nozzles or nozzle groupings (e.g., groupings of multiple nozzles at a position along the conduit) illustrated in the figures are referred to herein as nozzles, however it will be appreciated that each nozzle illustrated may include one or multiple nozzle outlets, and for example, nozzle 128*a* may include one nozzle outlet or multiple nozzle outlets for instance each directed at different spray angles. Accordingly, the nozzle sensors 122, 124 may be configured to sense fluid characteristics of the fluid flowing through the conduit 120 as the fluid travels to the nozzles. For instance, the nozzle sensor 122 may be configured to sense fluid characteristics of all downstream nozzles, e.g., nozzles 126*a*-126*f* and 128*a*-128*c*, while the nozzle sensor 124 may be configured to sense fluid characteristics of only nozzles 128*a*-128*c* arranged downstream therefrom. For instance, the nozzle sensor 124 may be arranged proximate to nozzles 128*a*-128*c* in the flue 404, and downstream of the nozzles 126*a*-126*f* such that the nozzle sensor 124 does not sense flow information of these nozzles.

The control box 110 may be configured to provide data related to operation of the system 100, such as cycles completed, cycle duration, amount of detergent used, sensed film deposit data, receiving nozzle threshold sensor values, providing nozzle operation, providing nozzle operation status, etc., or any combination thereof. The information may be stored in a database. The database may also include inspection data that indicates whether the cleaning operations are meeting expected standards. The database may provide alerts if cleaning operations need to be adjusted for not meeting expected standards. The database may also provide alerts if received data indicates that operation of a particular automated cooking range exhaust cleaning system is not as expected, such as missing scheduled cleaning operations, duration of an operation is not as expected, more or less detergent is being used than expected, etc., or any combination thereof. The database may also provide alerts if the nozzle operation reaches a threshold sensor value, indicating the threshold number of nozzles are clogged. In another example, the database may provide a nozzle operation status, which indicates how many nozzles are clogged. The nozzle operation status may be provided before the number of clogged nozzles reaches the threshold sensor value to trigger an alert. In another example, the nozzle operation status will periodically be provided, such as when the cleaning operation is running, regardless of whether the threshold sensor value is reached.

It is appreciated that the system 100 and the cooking range exhaust system 101 are exemplary, and that the components of the system 100 and/or the cooking range exhaust system 101 may be arranged differently, or may include fewer or additional components, without departing from the scope of the disclosure.

Figure 2:
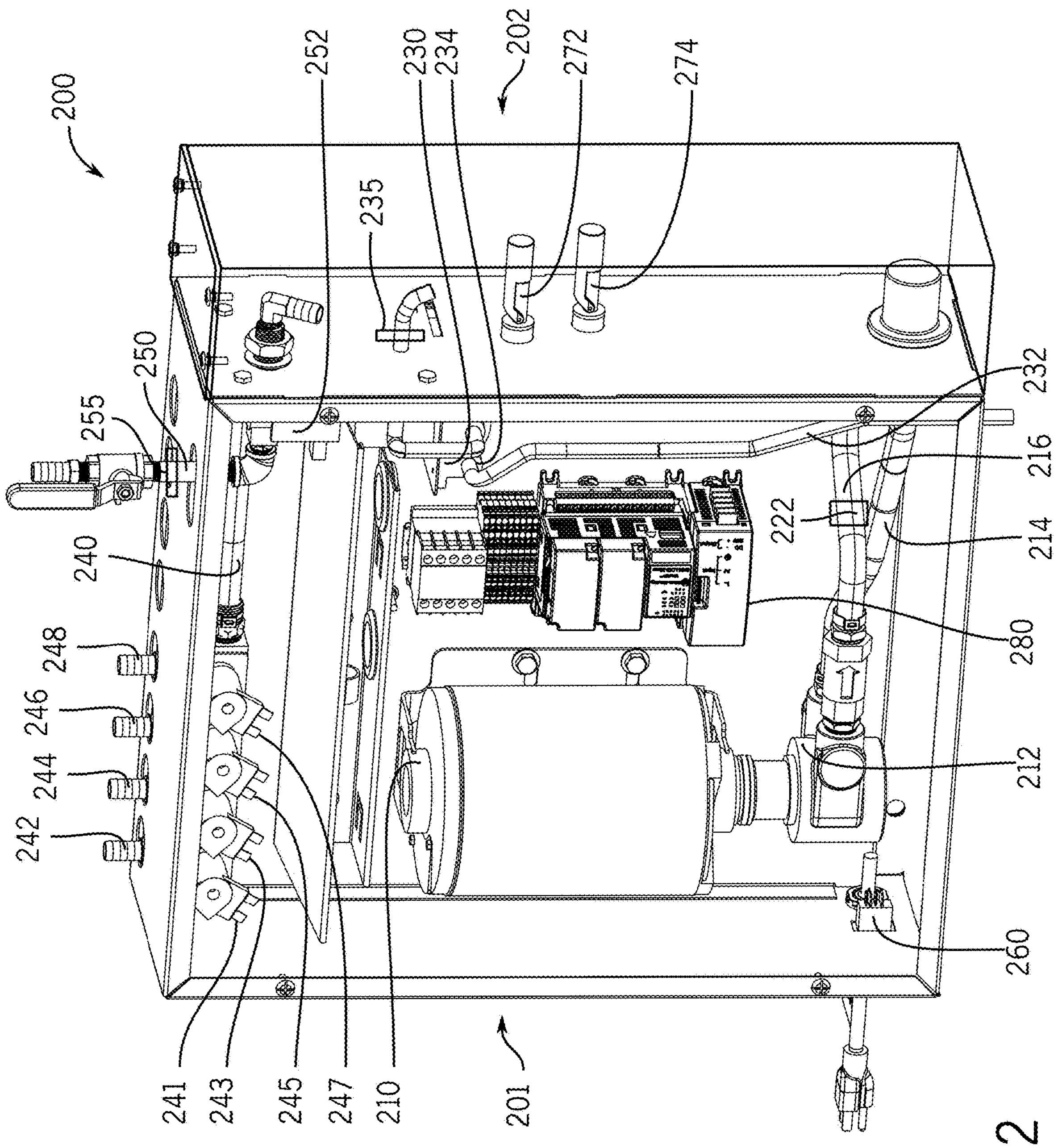
FIG. 2 depicts a diagram illustrating an exemplary control box for an automated range exhaust cleaning system configured to clean deposited film from surfaces of a range exhaust system according to the present disclosure.

FIG. 2 depicts a diagram illustrating an exemplary control box 200 for an automated range exhaust cleaning system configured to clean deposited film from surfaces of a range exhaust system in accordance with embodiments of the disclosure. The control box 200 may be implemented in the control box 110 of FIGS. 1A-1C, in some examples.

The control box 200 may receive power via a power supply connector 260 and may include a controller 280 to control operation of components of the control box 200 and communicatively coupled components of the range exhaust cleaning system. The controller 280 may include a microcontroller and memory, PLC controllers, field-programmable gate arrays, application-specific integrated circuits, or any combination thereof, that are capable of being programmed to perform operations described herein. The controller 280 may include various modules, circuits, sets of instructions, etc. to perform various operations described herein, such as a power supply, a spray scheduler, a valve controller, a pump controller, a mixing valve controller, a float switch monitor, timers, etc. In some examples, the controller 280 may include a memory configured to store executable instructions, and a processor or processing circuitry configured to execute the executable instructions to perform operations described herein.

In some examples, the controller 280 may include hardware and/or software configured enable connectivity to external devices and/or applications to perform various operations or functions, such as updating, monitoring, controlling, or any combination thereof. In some examples, the controller 280 may be configured to directly connect to an external computing device (e.g., a computer, a handheld device, a tablet, a smart phone, or any combination thereof). The direct connection may be via a physical connector or port (e.g., a universal serial bus (USB) port, a micro USB port, a serial port, an Ethernet port, or any other type of connectivity port) In other examples, the direct connection may be a wireless direct connection, such Bluetooth®, ZigBee®, Z-Wave®, near-field communication, and/or any other type of direct communication. In some examples, the controller 280 may be configured to communicate over a network, including a cellular network, a local area network, a wide-area network, or any combinations thereof. In some examples, the controller 280 may utilize the connectivity to provide various notifications, such as missed, interrupted, completed, etc., cleaning cycles; failure or fault information; notification of low detergent; notification of a full waste reservoir, etc. The controller 280 may further utilize the connectivity to provide cleaning cycle data, such as cycle duration for each zone, type(s) or amount of detergent used, mixing ratio, etc. The controller 280 may further utilize the connectivity to receive schedule module updates, cleaning cycle changes (e.g., mixing ratios, durations, etc. for each zone), to respond to requests for data, etc.

The control box 200 may include a control systems portion 201 and a reservoir 202. The control box 200 may include a water supply valve 252 connected to a water supply line 250. The controller 280 may be configured to control the water supply valve 252 to fill the reservoir 202 in preparation for a cleaning operation. The controller 280 may be configured to monitor float switches 272 and 274 in the controller 280 to determine when the reservoir 202 is sufficiently filled. The controller 280 may determine an amount of water held in the reservoir 202 based on a capacity of the reservoir 202, a time between activation of the float switches 272 and 274, or combinations thereof.

The control box 200 may also include one or more detergent pumps 230 configured to pump detergent received via a respective inlet 232 to the reservoir 202 via a respective outlet 234. While only one detergent pump 230 is shown, it is appreciated that the control box 200 may be configured with additional detergent pumps configured to pump different selected detergents depending on a cleaning application without departing from the scope of the disclosure. The respective detergent pumped via the one or more detergent pumps 230 into the reservoir 202 may mix with the water in the reservoir 202 to form a cleaning solution. The controller 280 may control the detergent pump 230 to pump (e.g., control a speed of the pump, length of time the pump is activated, or combinations thereof) to achieve the target detergent-to-water ratio. In some examples, the detergent-to-water ratio may range from 100% detergent (e.g., deep clean or waste conduit or drain flush) to 100% water (e.g., system rinse or flush).

The controller 280 may be configured to control a motor 210 connected to a pump 212 to pump the cleaning solution (e.g., or water if not detergent is added to the reservoir 202) from the reservoir 202 via an inlet 214 to a supply line 240 via an outlet 216, e.g., an outlet line fluidly coupled to a conduit such as conduit 120. The control box 200 further includes valves 241, 243, 245, and 247 coupled to the supply line 240. The controller 280 may control the valves 241, 243, 245, and 247 to provide the cleaning solution (e.g., water and detergent mixture) from the reservoir 202 to outlet ports 242, 244, 246, and 248, respectively. The valves 241, 243, 245, and 247 may include solenoids or some other mechanism configured to receive electrical signals from the controller 280 to control positions of the valves 241, 243, 245, and 247. The ports 242, 244, 246, and 248 may each be coupled to a different respective cleaning zone or application (e.g., cleaning waste conduit or drain lines).

The control box 200 may further include a nozzle sensor 222 proximal the pump 212. The nozzle sensor 222 may be positioned such that it monitors cleaning solution moving from the pump 212 to the outlet 216. The nozzle sensor 222 may monitor performance of the nozzles. In some examples, the nozzle sensor 222 is a pressure sensor. In some examples, the nozzle sensor 222 is a flow rate sensor. The control box 200 may receive nozzle sensor data from the nozzle sensor when the cleaning system is performing a cleaning operation, e.g., when the nozzles are dispensing cleaning fluid. In some examples, the control box 200 may determine whether any nozzles are clogged based on the data from the nozzle sensor and a threshold sensor value. The threshold sensor value may correspond to an absolute value, a historical value, or a relative change in cleaning solution flow compared to an expected flow. The control box 200 may distinguish between different zones, such that nozzle sensor data may be associated with the zone in operation. In some examples, the control box 200 may provide the nozzle sensor data to a backend system to be analyzed and stored.

The water supply line 250 may include a sensor 255 configured to sense water moving therethrough and the sensor 255 may be communicatively coupled to the control box 200. The sensor 255 may be arranged on or in the supply line 250, such as at an inlet or outlet thereof. The control box 200 may receive data from the sensor 255 when water is delivered to the cleaning system, e.g., during a filling operation of the reservoir 202. In some examples, the control box 200 may determine whether the water supply line 250 is operational or operating at an increased or reduced level compared to a threshold level. The threshold sensor value may correspond to an absolute value, a historical value, or a relative change in water flow from the water supply line compared to an expected water flow rate. The sensor 255 may be a flow sensor, pressure sensor, or any type of sensor disclosed herein. Based on information from the sensor 265, the control box 200 may adjust an amount of water and/or detergent delivered to the reservoir 202 for instance to reach a target dilution ratio. In addition or alternatively, the control box 200 may provide an alert that the water supply line 250 requires service. In some examples, the control box 200 may provide the sensor data to a backend system to be analyzed and stored.

The one or more detergent pumps 230 may include a sensor 235 configured to sense detergent moving through the outlet 234, and the sensor 235 may be communicatively coupled to the control box 200. The sensor 235 may be arranged on or in the outlet 234, or alternatively may be arranged on or in the inlet 232 or the pump 230. The control box 200 may receive data from the sensor 235 when detergent is delivered to the cleaning system, e.g., during a filling operation of the reservoir 202. In some examples, the control box 200 may determine whether the outlet 234 or pump 230 is operational or operating at an increased or reduced level compared to a threshold level. The threshold sensor value may correspond to an absolute value, a historical value, or a relative change in detergent flow from the pump compared to an expected detergent flow rate. The sensor 235 may be a flow sensor, pressure sensor, or any type of sensor disclosed herein. Based on information from the sensor 235, the control box 200 may adjust an amount of water and/or detergent delivered to the reservoir 202 for instance to reach a target dilution ratio. In addition or alternatively, the control box 200 may provide an alert that the detergent pump 230 or related components require service. In some examples, the control box 200 may provide the sensor data to a backend system to be analyzed and stored.

The arrangement of components in the control box 200 depicted in FIG. 2 is exemplary. A different arrangement of components may be implemented without departing from the scope of the disclosure. In addition, additional or fewer parts may be included without departing from the scope of the disclosure. The control box 200 may be configured to perform operations of the control box 110 as described with reference to FIGS. 1A-1C. In some examples, rather than premixing the detergent and the water in the reservoir 202, the control box 200 may include a post-mixing application whereby the pump 212 and the detergent pump 230 are both coupled directly to the supply line 240, and the controller 280 is configured to cause the pump 212 and the detergent pump 230 to operate contemporaneously to pump water and detergent, respectively, to the supply line 240 such that it is mixed in the supply line 240.

Figure 3A:
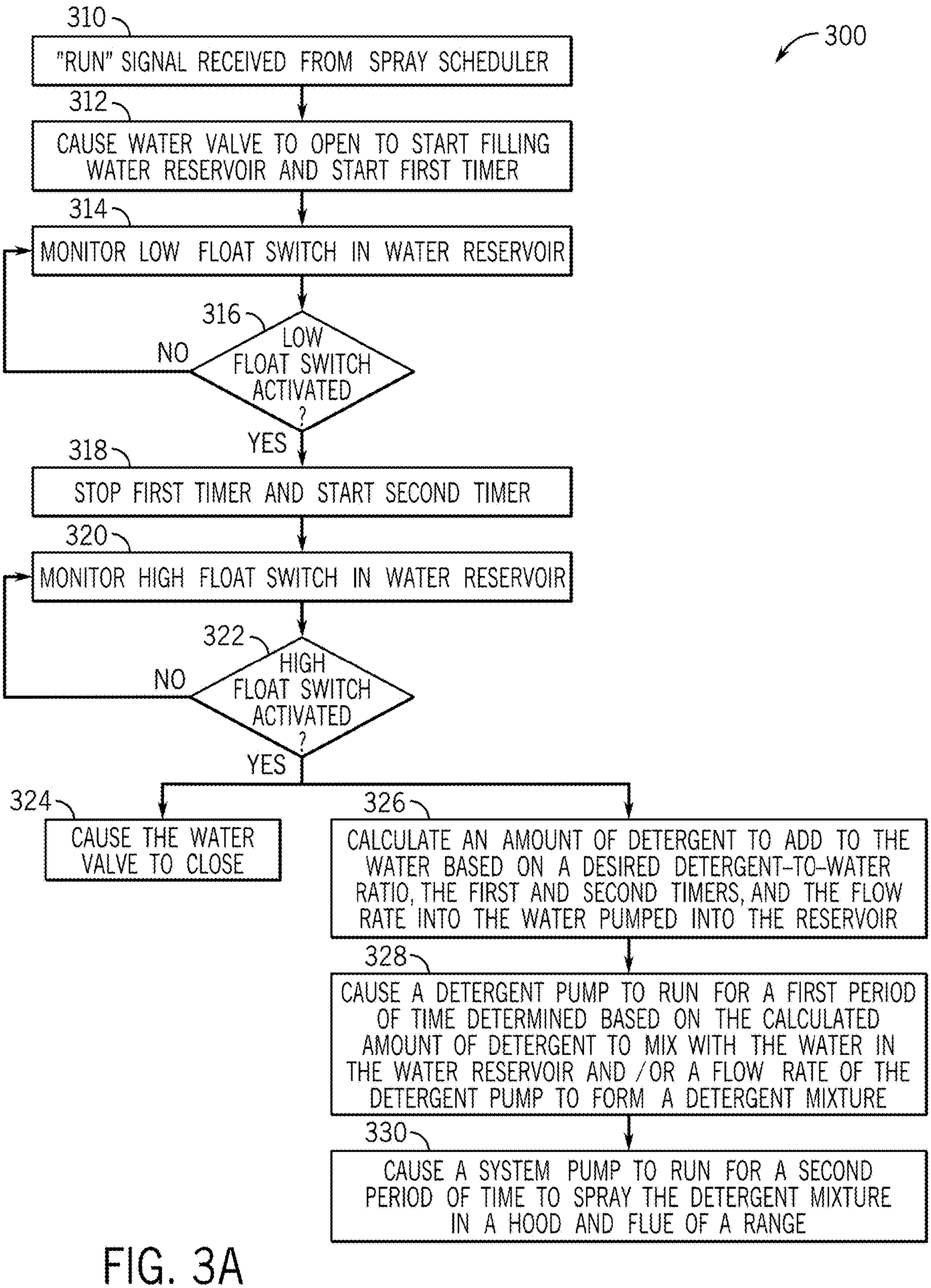
FIG. 3A is an exemplary flowchart of a method for performing a cleaning operation via an automated range exhaust cleaning system according to the present disclosure.

FIG. 3A is an exemplary flowchart of a method 300 for performing a cleaning operation via an automated range exhaust cleaning system in accordance with embodiments of the present disclosure. The method 300 may be performed by the control box 110 of FIGS. 1A-1C, the control box 200 of FIG. 2, or combinations thereof.

The method 300 may include receiving a run signal from a spray scheduler, at 310. The spray scheduler may be an application hosted on another device that is connected to the control box wirelessly or via a wired connection. In other examples, the spray scheduler is a module stored at the control box that maintains scheduling information for cleaning operations for the one or more zones of the cooking range exhaust system. In other examples, the method 300 may include receiving a run signal from a module configured to determine whether a film on the surfaces of the cooking range exhaust system or on the surfaces of the waste collection system exceeds a threshold based on data from one or more sensors or cameras.

The method 300 may further include causing a water valve to open to start filling a water reservoir and start a first timer, at 312. The method 300 may further include monitoring a low float switch (e.g., the float switch 274 of FIG. 2) in the water reservoir (e.g., the reservoir 202 of FIG. 2), at 314. The method 300 may further include determining whether the low float switch is activated, at 316. In response to a determination that the low float switch remains inactive, the method 300 may further include continuing to monitor the low float switch in the water reservoir, at 314. In response to a determination that the low float switch is activated, the method 300 may further include stopping the first timer and starting a second timer, at 318.

The method 300 may further include monitoring a high float switch (e.g., the float switch 272 of FIG. 2) in the water reservoir, at 320. The method 300 may further include determining whether the high float switch is activated, at 322. In response to a determination that the high float switch remains inactive, the method 300 may further include continuing to monitor the high float switch in the water reservoir, at 320.

In response to a determination that the low float switch is activated, the method 300 may further include causing the water valve to close, at 324, and calculating an amount of detergent to add to the water based on a target detergent-to-water ratio, the first and second timers, and a flow rate of the water pumped into the reservoir, at 326. The method 300 may further include causing the detergent pump to run for a first period of time determined based on the calculated amount of detergent to mix with the water in the water reservoir and/or a flow rate of the detergent pump to form a detergent mixture, at 328. The method 300 may further include causing a system pump to run for a second period of time to cause the detergent mixture to be provided to target nozzles or outlets for spraying or depositing the detergent and water solution in some or all of a range exhaust system or in some or all of the waste collection system, at 330. The range exhaust system may include the cooking range exhaust system 101 of FIGS. 1A-1C, the cooking range exhaust system 401 of FIGS. 4A-4C, and/or the cooking range exhaust system 501 of FIG. 5, in some examples. The waste collection system may include waste collection components of the cleaning systems and may include a waste reservoir 116, waste conduit 130 of FIGS. 1A-1C, the waste reservoir 416, conduits 422, 424 and 430, nozzle 423, trough 425, and orifices such as the drain orifice 431 of the waste conduit 430 of FIGS. 4A-4C, the waste reservoir 516, waste conduit 530, waste collection system 554 (e.g., sloped floor **554*a*, conduits 554*b*, 556 of FIG. 5 and so on. The target nozzles may include nozzles coupled to the conduit 120 of FIGS. 1A-1C, the conduits 420, 422 of FIGS. 4A-4C, the conduits 520, 552 of FIG. 5, or any conduit of the cleaning systems of the present disclosure. The target outlets may include ports, e.g., outlets, of the various conduits and waste conduits 130, 430, 530 554, 554*b* 556 of FIGS. 1A-1C, FIGS. 4A-4C, and 5**.

In some examples, the method 300 may further include filling the reservoir with just water and causing the water to be provided to the target nozzles or outlets to rinse the detergent from the cooking range exhaust system and/or from the waste collection system of the cleaning system. In some examples, the method 300 may be performed multiple times for a single cleaning operation may (e.g., multiple cycles of detergent spray and/or rinse), with the water reservoir refilled for each detergent or water application.

In some examples, the method 300 may further include determining whether the surfaces of the cooking range exhaust system or waste collection system are sufficiently clean via cameras or other sensors. In some examples, the method 300 may further include providing data related to the cleaning operation to a database configured to log cleaning operation activity.

In some examples, the method 300 may be stored as executable instructions in memory or other computer-readable medium of a controller (e.g., the controller 280 of FIG. 2) of the control box. The executable instructions may be executed by a processor or processing circuitry to perform the method 300, in some examples.

Figure 3B:
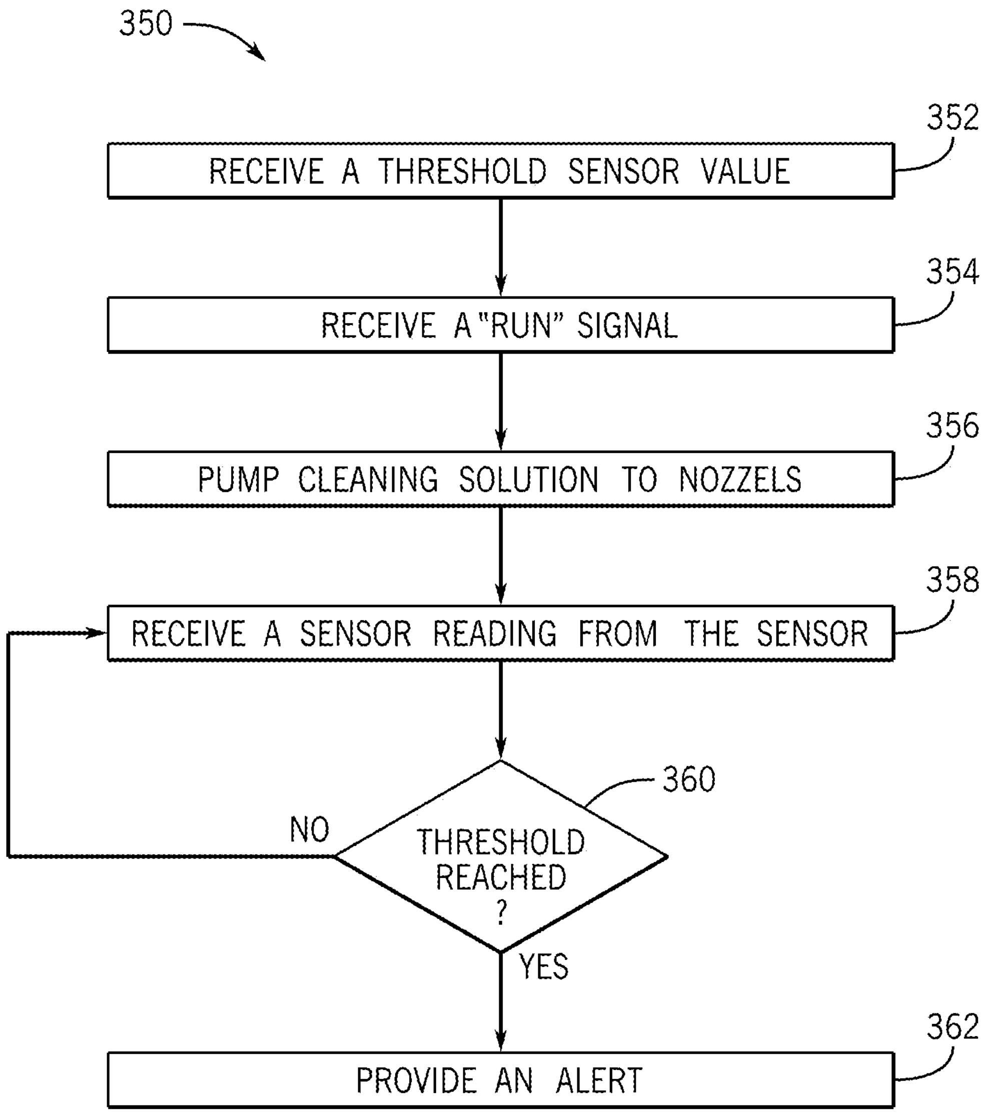
FIG. 3B is an exemplary flowchart of a method for detecting a clog in one or more nozzles according to the present disclosure.

FIG. 3B is an exemplary flowchart of a method 350 for detecting a clog in one or more nozzles according to the present disclosure. The method 350 may be performed by the control box 110 of FIGS. 1A-1C, the control box 200 of FIG. 2, the control box 410 of FIG. 4, the control box 510 of FIG. 5, or combinations thereof.

The method 350 may include receiving a threshold sensor value, at 352. The threshold sensor value may be used to indicate when the system needs maintenance. For example, the threshold sensor value may be used to indicate when nozzles are clogging or clogged. In an example, the threshold sensor value may be received from an external device or interface wired or wirelessly connected to the control box. In another example, the threshold sensor value may be determined based on historical sensor data. The threshold may be an absolute value, a historical value, or a deviation from a historical value. The threshold may be periodically updated by a user or automatically by the controller, e.g., based on historical data. The threshold value may differ depending on the sensor position, e.g., on whether the sensor is arranged at the control box or proximate a group (e.g., zone) or groups of nozzles (e.g., two or more zones). The threshold sensor value may be a pressure threshold, a flow rate threshold, a fluid level threshold, an ultrasonic value threshold, a capacitance value threshold, conductance value threshold, optical value threshold, and so on. The threshold sensor value may correspond to a number of clogged nozzles, e.g., one, two, three, four, five, six, seven, eight, nine, ten, fifteen, twenty, twenty-five, thirty, 40, 50, 60, 70, 80, 90, 100 or more nozzles, or 1%, 2%, 3%, 4%, 5%, 10%, 15%, 20%, 25%, 30%, 40%, 50%, 60%, 70%, 80%, 90% or 100% of the nozzles. The sensor value may correspond to partially clogged nozzles, a combination of partially clogged and fully clogged nozzles, or fully clogged nozzles. The sensor value may correspond to a threshold value corresponding to blockage of a portion or all of the total amount of orifice area available across a plurality of nozzles arranged downstream of the nozzle sensor (e.g., nozzle sensor 122, 124, 222, 442, 444, and so on), such as 1%, 2%, 3%, 4%, 5%, 10%, 15%, 20%, 25%, 30%, 40%, 50%, 60%, 70%, 80%, 90% or 100% of the total orifice area available across the plurality of nozzles, such as blockage of about 2, 3, 4, 5, 10, 15, 20, 25, 30, 35 or 40 nozzles of the total number of nozzles, or blockage of about 1 or more nozzles including any of the preceding aforementioned number of nozzles.

The method 350 may include receiving a run signal from a spray scheduler, at 354. The spray scheduler may be an application hosted on another device that is connected to the control box wirelessly or via a wired connection. In other examples, the spray scheduler is a module stored at the control box that maintains scheduling information for cleaning operations for the one or more zones of the cooking range exhaust system. In other examples, the method 350 may include receiving a run signal from a module configured to determine whether a film on the surfaces of the cooking range exhaust system or on the surfaces of the waste collection system exceeds a threshold based on data from one or more sensors or cameras. The run signal may specify which zone, e.g., group of nozzles, or zones, e.g., groups of nozzles, should be cleaned. The run signal may include which cleaning solution should be used to clean the zone or zones. The run signal may include a dilution rate of the cleaning solution with water for cleaning the zone or zones.

The method 350 may further include causing the system pump 212 to run for a period of time causing the cleaning solution to be provided to the target nozzle or nozzles, at 356. The target nozzle or nozzles may include nozzles coupled to the conduit 120 of FIGS. 1A-1C, e.g., nozzles 126*a*-126*f* and 128*a*-128*f* of FIG. 1C, nozzles coupled to the conduit 420 of FIGS. 4A-4C, e.g., nozzles 446*a*-446*f* and 448*a*-448*f* of FIG. 4C, the nozzles 550 of the cleaning fan system 540 of FIG. 5, and so on. The system may include valves configured to direct the cleaning solution from the pump to the designated zone or zones via one or more conduits.

The method 350 may further include receiving a sensor reading, at 358. The sensor reading may be a pressure reading, a flow rate reading, or any other sensor reading data corresponding to the types of sensors disclosed herein. The sensor reading may be received once during the period of time the pump 212 is running. For example, the sensor reading may be received at a preset time after the pump begins to run. The sensor reading may be received continuously or periodically while the pump is running. The control box may be set up such that any cleaning operation uses the same pump and same outlet (e.g., outlet line of the control box), regardless of the zone of the cleaning operation, such that only one sensor provides sensor readings. In another example, the method 350 may receive sensor readings from a sensor arranged on a conduit downstream of the control box. In another example, the method 350 may receive sensor readings from any of a plurality of sensors that has cleaning solution passing the sensor.

The method 350 may further include determining whether the threshold sensor value has been reached, at 360. To determine whether the threshold sensor value has been reached, the sensor reading may be compared to the threshold sensor value. By comparing the sensor reading to the threshold sensor value, the method 350 may determine whether any nozzles are partially clogged or clogged. If the threshold sensor value and sensor reading are pressure values, the threshold may be reached when the sensor reading is greater than the threshold sensor value, because as nozzles clog, pressure increases. If the threshold sensor value and sensor reading are flow rate values, the threshold may be reached when the sensor reading is less than the threshold sensor value, because as nozzles clog, flow rate decreases. The method 350 may have multiple threshold sensor values. For example, there may be a threshold sensor value for each zone. As another example, there may be a threshold sensor value for different cleaning solutions. In another example, there may be a threshold sensor value for each sensor where a plurality of sensors are present in the system. The threshold sensor value for comparison may be selected based on information provided by the run signal. Where multiple nozzle sensors are used, the method 350 may further involve comparing sensor values to their respective threshold sensor values, and comparing differences therebetween to determine or estimate which nozzle or group of nozzles may be clogged or partially clogged. For instance, based on the comparison, the method 350 may determine that nozzles in one zone (e.g., flue nozzles) are relatively more clogged compared to nozzles in anther zone (e.g., hood nozzles), or vice versa. In such examples, the sensor value for one set of nozzles may be closer to the threshold sensor value than the other set of nozzles. If threshold is not reached, the method 350 may continue to receive sensor readings. In some examples, if the threshold is not reached, the method 350 may wait until a new run signal is received to receive a new sensor reading. In an example, if the threshold is not reached, the method 350 may provide a nozzle operation status to the external device. For example, the nozzle operation status may indicate the number of nozzles clogged or partially clogged, the percentage of clogging or clogged nozzles, the sensor reading as a pressure or flow rate, or a combination thereof.

If the threshold is reached, the method 350 may provide an alert, at 362. The alert may be provided to an external device through remote communication. The alert may be provided to a display, a light, and/or a speaker. The alert may be provided to the control box. The alert may include a nozzle operation. The nozzle operation may include an indication that the nozzles are clogged. The nozzle operation may include an indication that nozzles require maintenance. The nozzle operation may include the zone that includes the clogged nozzles. The alert may include a nozzle operation status. The nozzle operation status may indicate the extent of clogging of the nozzles. For example, the nozzle operation status may indicate the number of nozzles clogged or partially clogged, the percentage of clogging or clogged nozzles, the sensor reading as a pressure or flow rate, the zone that had the sensor reading collected, or a combination thereof.

In some examples, the method 350 may be stored as executable instructions in memory or other computer-readable medium of a controller (e.g., the controller 280 of FIG. 2) of the control box. The executable instructions may be executed by a processor or processing circuitry to perform the method 350, in some examples.

Figure 3C:
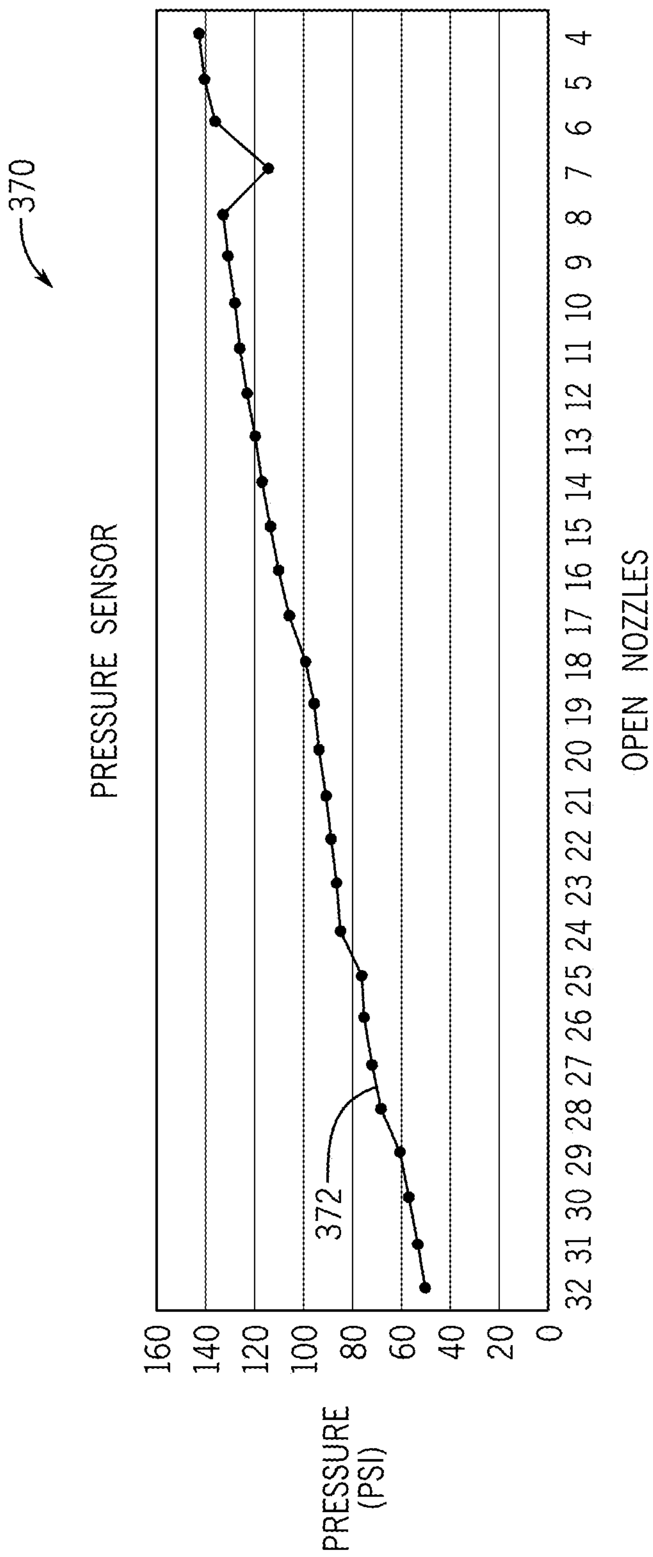
FIG. 3C depicts a graph of pressure in the automated range exhaust cleaning system based on a number of open nozzles according to the present disclosure.

FIG. 3C depicts an exemplary graph 370 of pressure in the automated range exhaust cleaning system based on a number of open nozzles according to the present disclosure. The graph 370 was generated according to the following test method and shows a number of open nozzles and their corresponding pressure (psi). The test method involved use of a M7100 series pressure transducer from TE Connectivity installed on the outlet of a pump in a cleaning system. A configuration of 32 nozzles to simulate a typical flue installation was attached to one of the system's zones. The system was operated to initiate a typical spray event, and after the system pump was activated, a pressure reading was taken while the line was pressurized, and spraying was occurring. After each test run, one nozzle was removed from the configuration and replaced with a solid plug simulating one completely clogged nozzle. The spray initiation and reading procedure was then repeated. Successive nozzles were removed until only 4 nozzles remained in the configuration.

The graph 370 shows the in-line pressure reading (psi) from a nozzle sensor as 32 nozzles were gradually clogged, however, as will be appreciated, the system may include a plurality of nozzles across a plurality of zones. The system may include various zones for cleaning, each including a plurality of nozzles. When all of the nozzles are operating properly (i.e., not clogged), and the pump is pumping cleaning solution, the sensor may have a first pressure. As nozzles are clogged, the pressure may increase along a predictable trend line 372. For example, the pressure may increase by approximately 2 psi for each nozzle that is clogged. The control box 110 may be programmed with instructions to control or perform methods that monitor gradual clogging of the plurality of nozzles, e.g., the 32 nozzles, which may be used in connection with method 350. For instance, one or more pressure values along the trend line 372 may correspond to one or more threshold values received at 352.

Figure 3D:
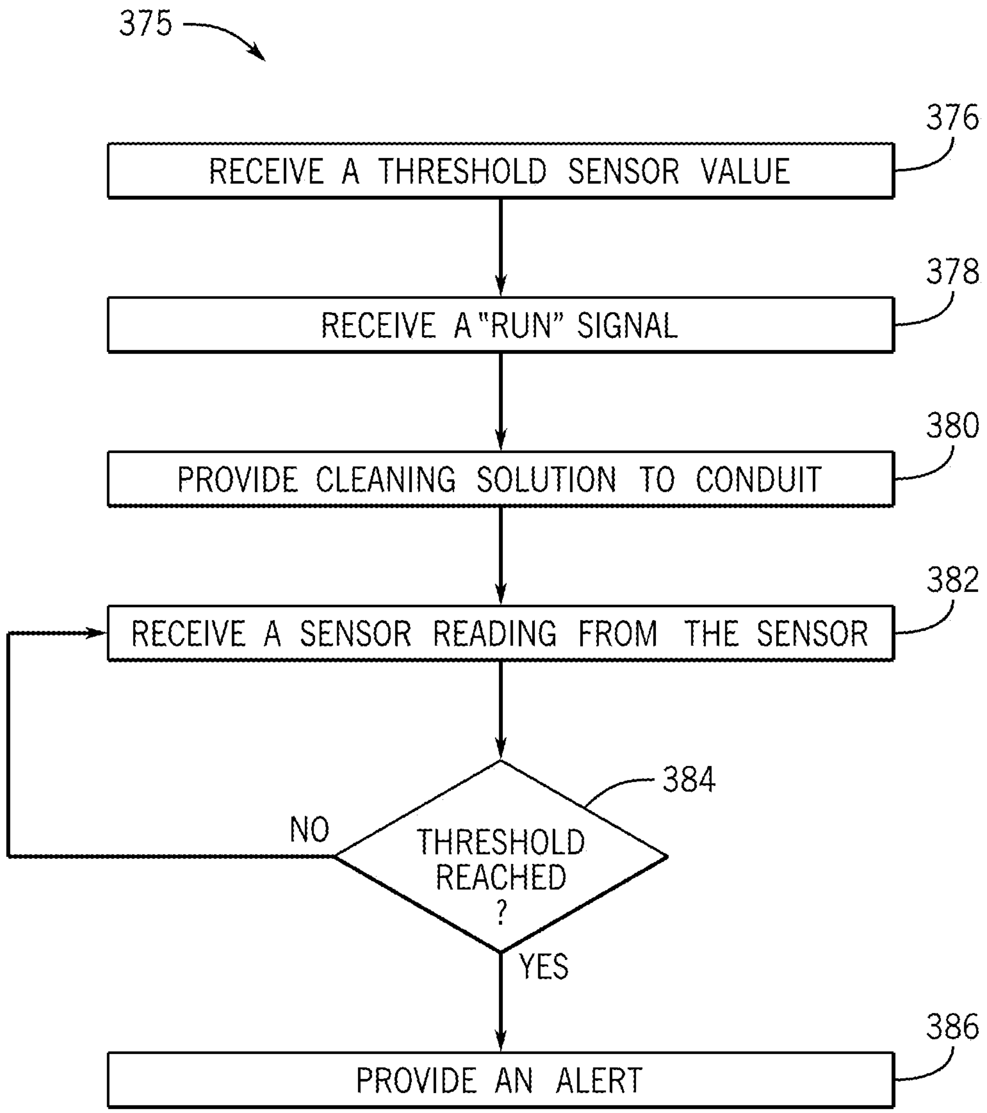
FIG. 3D is an exemplary flowchart of a method for detecting a clog in a fluid conduit according to the present disclosure.

FIG. 3D is an exemplary flowchart of a method 375 for detecting buildup or a clog in one or more fluid conduits or vessels according to the present disclosure. In some examples, the method 375 may be employed using sensors configured to sense fluid in the waste collection system of the cleaning systems of the present disclosure. The conduit or vessel in which or on which the sensor is positioned may not necessarily be fluidly coupled to a nozzle, and for instance may terminate at a delivery orifice, an outlet port, a vessel, a drain and so on. The conduit or vessel may be configured to receive cleaning fluid after it has been dispensed from a nozzle, and for instance the cleaning fluid may stream into the vessel (e.g., into a waste reservoir 116, 416, 516), or a waste conduit. The method 375 may be performed by the control box 110 of FIGS. 1A-1C, the control box 200 of FIG. 2, the control box 410 of FIG. 4, the control box 510 of FIG. 5, or combinations thereof.

The method 375 may include receiving a threshold sensor value, at 376. The threshold sensor value may be used to indicate when the system needs maintenance. For example, the threshold sensor value may be used to indicate when the waste collection system or component thereof is clogging or clogged or has a requisite level of buildup. In an example, the threshold sensor value may be received from an external device or interface wired or wirelessly connected to the control box. In another example, the threshold sensor value may be determined based on historical sensor data. The threshold may be an absolute value, a historical value, or a deviation from a historical value. The threshold may be periodically updated by a user or automatically by the controller, e.g., based on historical data. The threshold value may differ depending on the sensor position, e.g., on whether the sensor senses fluid movement through a conduit or senses a level of fluid in a vessel. The threshold sensor value may be a pressure threshold, a flow rate threshold, a fluid level threshold, an ultrasonic value threshold, a capacitance value threshold, conductance value threshold, optical value threshold, and so on. The threshold sensor value may be a flow rate threshold. The threshold sensor value may correspond to level of occlusion of the conduit such as 10%, 15%, 20%, 25%, 30%, 40%, 50%, 60%, 70%, 80%, 90% or 100% occlusion. The sensor value may correspond to partially conduit or a fully clogged conduit. The sensor value may correspond to a threshold value corresponding to blockage of a portion or all of the total amount of orifice area available across the outlet port of the conduit such as 1%, 2%, 3%, 4%, 5%, 10%, 15%, 20%, 25%, 30%, 40%, 50%, 60%, 70%, 80%, 90% or 100% of the total orifice area available across the orifice opening at the outlet of the conduit. The sensor value may correspond to a threshold value corresponding to a level of fluid in a vessel configured to be drained, such as a waste collection vessel with a drain port. The threshold sensor value may correspond to fill level of the vessel as 10%, 15%, 20%, 25%, 30%, 40%, 50%, 60%, 70%, 80%, 90% or 100% full.

The method 375 may include receiving a run signal from a fluid delivery scheduler, at 378. The fluid delivery scheduler may be an application hosted on another device that is connected to the control box wirelessly or via a wired connection. In other examples, the fluid delivery scheduler is a module stored at the control box that maintains scheduling information for cleaning operations for the one or more zones of the cooking range exhaust system or for cleaning operations of the waste collection system. In other examples, the method 350 may include receiving a run signal from a module configured to determine whether a film on the surfaces of the cooking range exhaust system or on the surfaces of the waste collection system exceeds a threshold based on data from one or more sensors or cameras. The run signal may specify which zone or zones should be cleaned. The run signal may include which cleaning solution should be used to clean the zone or zones. The run signal may include a dilution rate of the cleaning solution with water for cleaning the zone or zones.

The method 375 may further include causing the cleaning solution or water to be provided to a target, at 380. The target may include any of the waste conduits 130, 430, 530, waste reservoirs 116, 416, 516, trough 425 and so on of FIGS. 1A-1C, 4A-4C and 5 configured to receive the cleaning solution, which may include dispensed cleaning solution that has been used to clean surfaces of the range exhaust system or the waste collection system. The system may include valves configured to direct the cleaning solution from the pump to the designated conduits, vessels, and so on. For instance, the system pump 212 may cause the cleaning solution to be dispensed via nozzles, and the dispensed cleaning solution may be provided to the target as it flows into vessels and troughs and through conduits and drains of the waste collection system by the force of gravity.

The method 375 may further include receiving a sensor reading, at 382. The sensor reading may be a pressure reading, a flow rate reading, or any other sensor reading data corresponding to the types of sensors disclosed herein. The sensor reading may be received once during the period of time the pump is running or during a cleaning operation. For example, the sensor reading may be received at a preset time after the pump begins to run. The sensor reading may be received continuously or periodically while the pump is running. The control box may be set up such that any cleaning operation uses the same pump and same outlet (e.g., outlet line of the control box), regardless of the zone of the cleaning operation, such that only one sensor provides sensor readings. In another example, the method 375 may receive sensor readings from a sensor arranged on a conduit or vessel downstream of the control box. In another example, the method 375 may receive sensor readings from any of a plurality of sensors that has cleaning solution passing the sensor.

The method 375 may further include determining whether the threshold sensor value has been reached, at 384. To determine whether the threshold sensor value has been reached, the sensor reading may be compared to the threshold sensor value. By comparing the sensor reading to the threshold sensor value, the method 375 may determine whether the conduit or vessel is partially clogged or clogged. If the threshold sensor value and sensor reading are pressure values, the threshold may be reached when the sensor reading is greater than the threshold sensor value, because as the conduit clogs, pressure increases. If the threshold sensor value and sensor reading are flow rate values, the threshold may be reached when the sensor reading is less than the threshold sensor value, because as the conduit clogs, flow rate decreases. The method 375 may have multiple threshold sensor values. If the threshold sensor value and sensor reading are fill level values, the threshold may be reached when the sensor reading is higher than the threshold sensor value due to the vessel filling above the threshold level. For example, there may be a threshold sensor value for each zone. As another example, there may be a threshold sensor value for different cleaning solutions. In another example, there may be a threshold sensor value for each sensor where a plurality of sensors are present in the system. The threshold sensor value for comparison may be selected based on information provided by the run signal. If threshold is not reached, the method 375 may continue to receive sensor readings. Where multiple conduits and/or vessel sensors are used, the method 375 may further involve comparing sensor values to their respective threshold sensor values, and comparing differences therebetween to determine or estimate which conduit may be clogged or partially clogged. For instance, based on the comparison, the method 375 may determine that a conduit in one zone (e.g., fan conduit or flue conduit) is relatively more clogged compared to a conduit in anther zone (e.g., hood conduit), or vice versa. In such examples, the sensor value for one set of nozzles may be closer to the threshold sensor value than the other set of nozzles. In some examples, if the threshold is not reached, the method 375 may wait until a new run signal is received to receive a new sensor reading. In an example, if the threshold is not reached, the method 375 may provide a conduit operation status to the external device. For example, the conduit operation status may indicate the conduit is partially clogged, the percentage of clogging, the sensor reading as a pressure or flow rate, or a combination thereof.

If the threshold is reached, the method 375 may provide an alert, at 386. The alert may be provided to an external device through remote communication. The alert may be provided to a display, a light, and/or a speaker. The alert may be provided to the control box. The alert may include a conduit operation. The conduit operation may include an indication that the conduit is clogged. The conduit operation may include an indication that the conduit requires maintenance. The conduit operation may include the zone that includes the clogged conduit. The alert may include a conduit operation status. The conduit status may indicate the extent of clogging of the conduit. For example, the conduit operation status may indicate the conduit is partially clogged, the percentage of clogging, the sensor reading as a pressure or flow rate, the zone that had the sensor reading collected, or a combination thereof.

In some examples, the method 375 may be stored as executable instructions in memory or other computer-readable medium of a controller (e.g., the controller 280 of FIG. 2) of the control box. The executable instructions may be executed by a processor or processing circuitry to perform the method 375, in some examples.

The nozzle and conduit sensors may remotely communicate to the database for comparison to a threshold value, or historic readings. The historic readings can provide a first nozzle sensor reading from when the system ran with all nozzles operational. When comparing the nozzle sensor reading to the threshold value or historic reading, the database can determine if there are clogged nozzles and/or conduits based on changes in the pressure. In some examples, the database may determine or estimate how many nozzles and/or conduits are clogged based on the changes in pressure.

As will be appreciated from methods 300, 350 and 375, the methods may be applicable to the cleaning system as a whole or portions thereof, such as the spraying system, to the waste collection system, to the hood, flue, fan, and the various zones of the cleaning system such as one or more of the hood zones, flue zones, exhaust fan zones, and waste collection system zones.

Figure 4A:
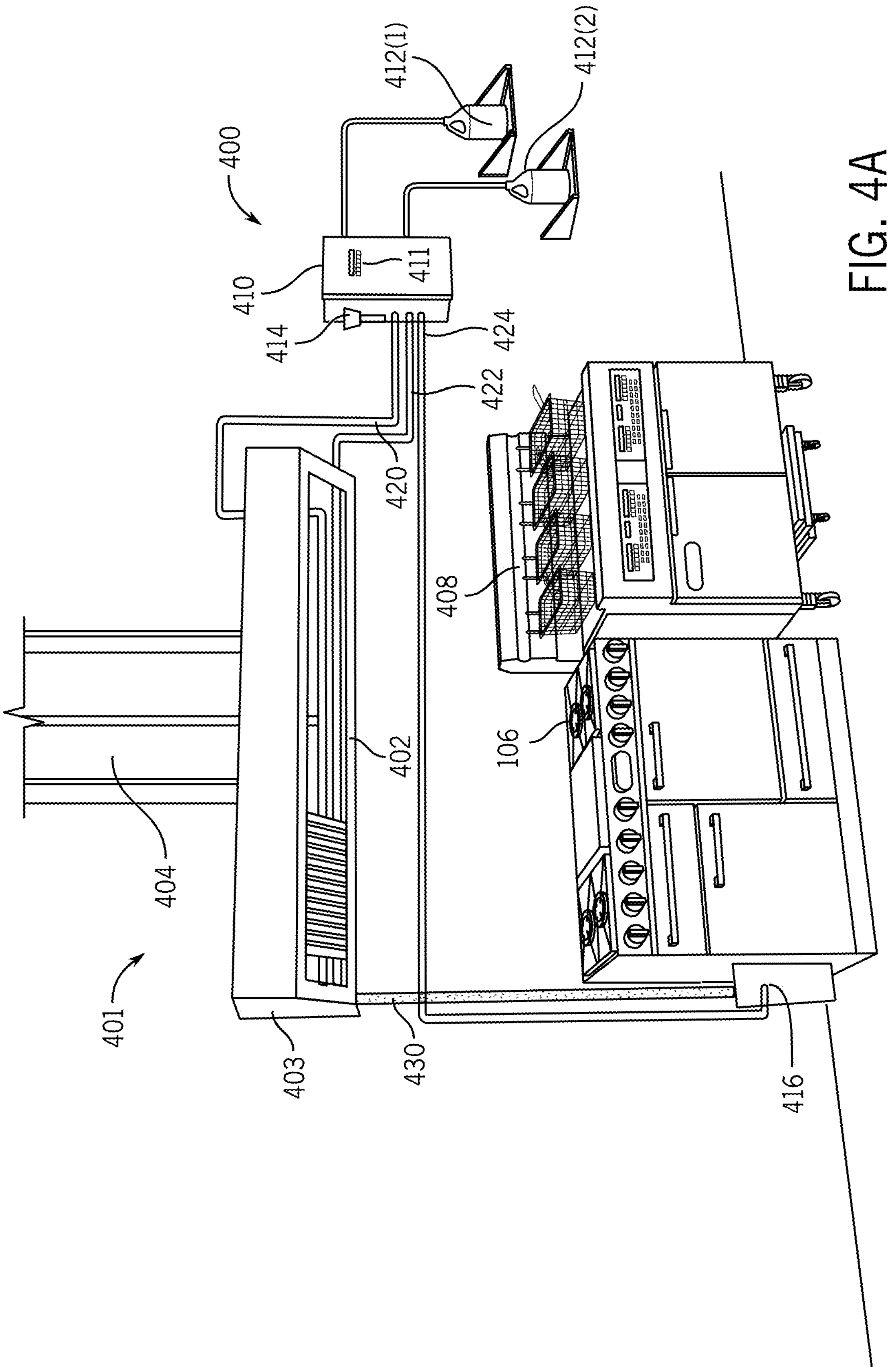
FIGS. 4A-4C depict diagrams illustrating an exemplary automated kitchen cleaning system configured to clean deposited film/build-up from surfaces of a cooking range exhaust system, a waste conduit, and/or a drain or waste reservoir according to implementations of the present disclosure.
Figure 4B:
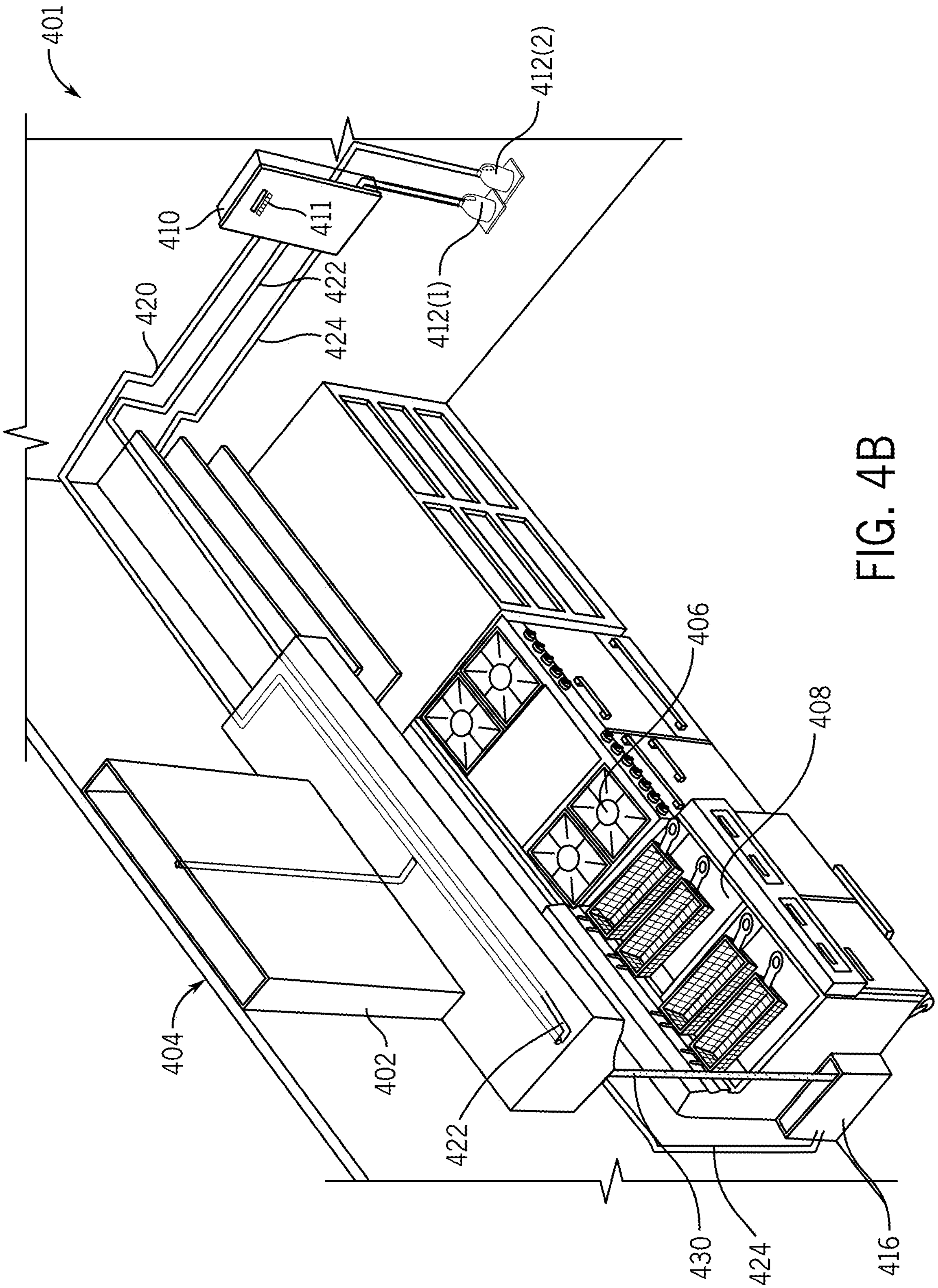
Figure 4C:
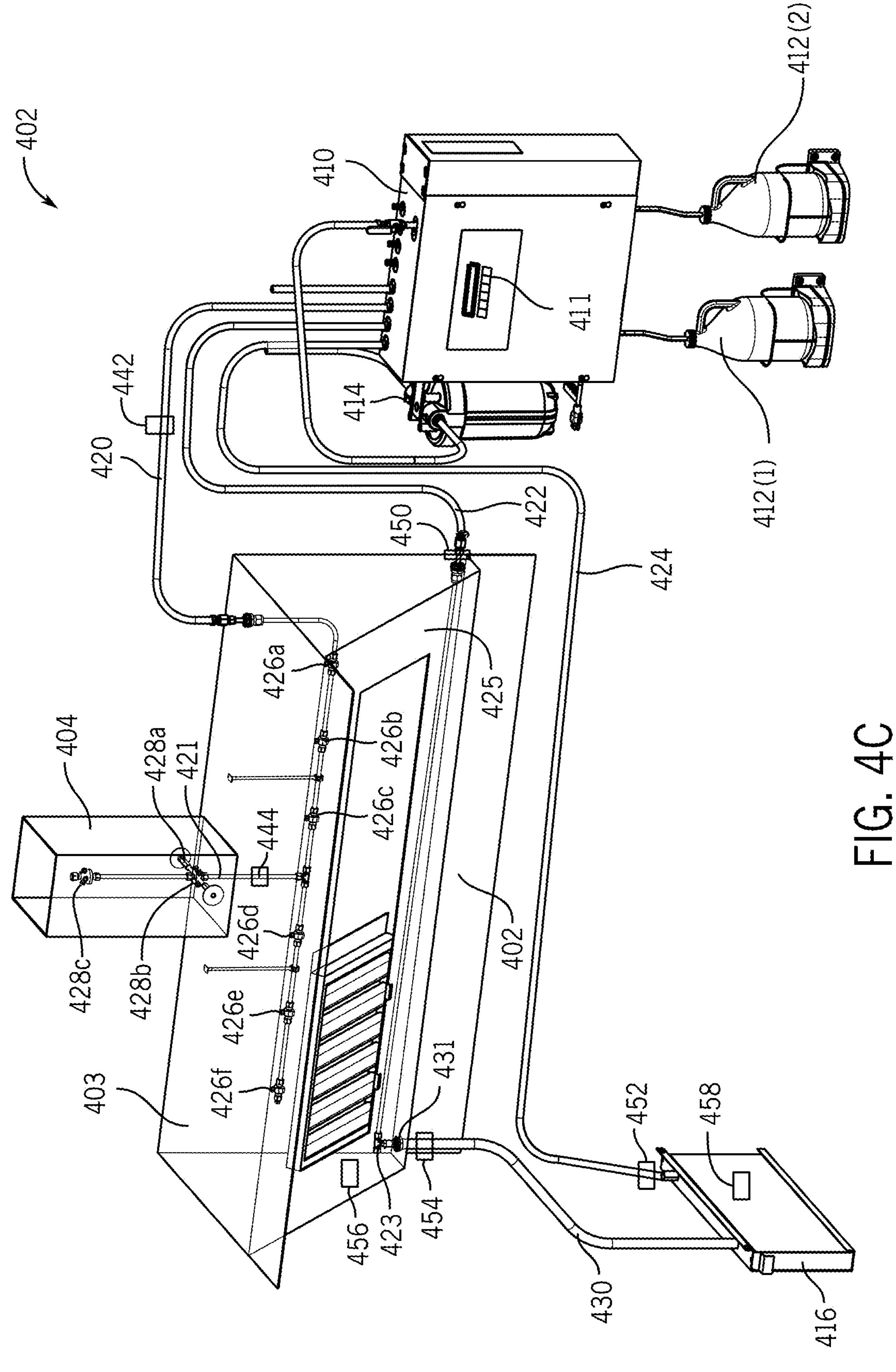

FIGS. 4A-4C depict diagrams illustrating an exemplary automated kitchen cleaning system 400 configured to clean deposited film/build-up from surfaces of a cooking range exhaust system 401 (e.g., including a backsplash 402, a hood 403, a flue 404, and any connecting pipes or conduit), a waste conduit 430, and/or a drain or waste reservoir 416 in accordance with embodiments of the disclosure. The system 400 includes a control box 410, detergent supplies 412(1)-(2), a water supply inlet 414, a waste reservoir 416, and conduit 420. The cooking range exhaust system 401 may remove or exhaust cooking effluent (e.g., smoke, odors, grease, other types of cooking effluent, etc.) away from a cooking range 406 and/or a fryer 408. The control box 410 may implement the control box 200 of FIG. 2, in some examples.

Over time, grease and other particles that are entrained in the exhaust effluent may be deposited on the surfaces of the backsplash 402, the hood 403, the flue 404, etc. to form a film. Similar build-up may occur in the waste conduit 430 and/or the drain or waste reservoir 416 resulting from use and/or previous cleaning cycles.

The system 400 may be configured to automatically clean the film from the cooking range exhaust system 401 and the waste collection system, e.g., the waste conduit 430, and/or the drain or waste reservoir 416, which may include application of a degreasing solution provided via one or more of the detergent supplies 412(1)-(2). While only two of the detergent supplies 412(1)-(2), it is appreciated that the kitchen cleaning system 400 may be adapted to accommodate more than two different detergent supplies.

In some examples, the system 400 may be selectively configured to clean one or more of the inside surfaces of the cooking range exhaust system 401 (e.g., inside of the hood 403 and the flue 404, but not the outside of the hood 403 or the flue 404, filters; or the backsplash 402), the waste conduit 430, and/or the drain or waste reservoir 416.

In some embodiments, to clean the cooking range exhaust system 401, the system 400 includes a spray system with conduit 420 disposed in, on, or proximate to parts of the cooking range exhaust system 401, the hood 403 and/or the flue 404, and may be arranged to spray surfaces with a detergent solution and/or water. In some examples, the conduit 420 may include two or more zones of independently activated or controlled groups of nozzles. In some examples, the zones may each have an independent set of pipes. In other examples, the zones may share some pipes with other zones, yet the nozzles are independently activated or controlled.

In some embodiments, the system 400 may empty into a floor drain (e.g., common drain) 416 or into a waste reservoir 416 via a waste conduit 430. Over time, the drain or waste reservoir 416 and/or the waste conduit 430 may become clogged with grease and other materials removed during cleaning cycles. Thus, these elements of the system 400 may also need to undergo cleaning to flush out those lines. In some embodiments, to clean the waste conduit 430, the system 400 includes a conduit 422 configured to carry detergent and/or water to the waste conduit 430. In some examples, the conduit may tap into a side of the waste conduit 430. In other examples, the conduit 422 may empty into an opening at a top of the waste conduit 430. For instance, the conduit 422 may be fluidly coupled to one or more nozzles 423 that may direct sprayed detergent and/or water to a port or drain orifice 431 of the waste conduit 430. The drain orifice 431 may be coupled to or form a part of the hood 403, and thus the waste conduit 430 may be fluidly coupled to an interior of the hood 403. For instance, the hood 403 may define or be coupled to a trough 425 at a lower end of the hood 403 and the trough may be configured to collect, grease, detergent and/or water as well as resulting cleaning waste after being sprayed or deposited during a cleaning operation. For instance, the trough 425 may be attached to the hood 403, be a part of the hood 403, or be a removable feature used with the hood 403. The trough 425 may direct the collected fluids to the drain orifice 431 for removal and may thus be a component of the waste collection systems of the present disclosure.

In some embodiments, to clean the drain or waste reservoir 416, the system 400 includes a conduit 424 configured to carry detergent and/or water to the waste reservoir 416. In some examples, the conduit may tap into a side of the waste reservoir 416. In other examples, the conduit 424 may empty into an opening at a top of the waste reservoir 416.

In some examples, the drain or waste reservoir 416, trough 425 and/or the waste conduit 430 or other components of the waste collection system may undergo less frequent cleaning cycles than the cooking range exhaust system 401. In some examples, cleaning of the drain or waste reservoir 416, trough 425 and/or the waste conduit 430 may utilize different types and/or different concentrations of detergents selected from the detergent supplies 412(1)-(2) than the cooking range exhaust system 401. In some examples, the conduit 422 and/or the conduit 424 may be larger and capable of carrying a higher volume of water than the conduit 420.

The control box 410 may be configured to control operation of the system 400, including cleaning operation parameters or configurations for individual zones of the conduit 420, the conduit 422, and/or the conduit 424. The control box 410 may receive water at a water supply inlet 414. The water supply inlet 414 may include a filter to filter the supply water prior to entering the system 400. The control box 410 may also receive detergent from one or more of the detergent supplies 412(1)-(2). The control box 410 may be programmed to control, on a zone-by-zone basis, scheduling cleaning operations (e.g., frequency and times), a duration of a cleaning cycle, detergent-to-water ratios, number of spray or flush cycles per cleaning operation, duration of individual spray or flush cycles, or any combination thereof.

In some examples, the control box 410 may include a wireless interface (e.g., Wi-Fi, Bluetooth, etc.) for providing cleaning operation data, completed or missed cleaning cycles, receiving configuration settings, providing status information (e.g., online or offline, faults or errors, etc.), etc., or any combination thereof. The control box 410 may interface with an electronic device (e.g., a smartphone, tablet, any other computing or electronic device, etc.) via the wireless interface. Additionally or alternatively, the control box 410 may include a wired interface for providing cleaning operation data, completed or missed cleaning cycles, receiving configuration settings, receiving nozzle threshold sensor values, providing nozzle operation, providing nozzle operation status, providing status information (e.g., online or offline, faults or errors, etc.), etc., or any combination thereof. Thus, the wireless and/or wired interface may facilitate configuration of the control box 410 to control operation of the system 400 according to specified settings.

As previously described, the spent cleaning solution and film debris removed from the cooking range exhaust system 401 may drain via the waste conduit 430 to the drain or waste reservoir 416. In examples where the drain or waste reservoir 416 is a waste reservoir, the waste reservoir may be emptied as necessary. In some examples, where the waste conduit 430 empties directly to a drain (e.g., rather than to the waste reservoir 416), the drain may also be configured to receive other wastewater from other the kitchen operations.

The control box 410 may control output devices, such as, solenoids, cleaning solution pumps, water and detergent pumps, valves, etc. The control box 410 may further monitor various input devices, such as timing sensors, timers, cancel/abort input signals, float switches, etc. In some examples, the control box 410 may include a microcontroller and a memory that is programmed with instructions to control or perform methods or operation described herein. In some examples, the control box 410 includes a programmable logic controller (PLC) configured to be programmed to control or perform methods or operations described herein.

In some examples, the control box 410 may monitor one or more float switches from a set of float switches in real time before the cleaning operation to determine how much volume of detergent from the detergent supply 412 needs to be added by a detergent pump to meet the desired detergent and water mixing ratio. The float switches may be actuated by incoming water from the water supply 414. The control box 410 may cause the detergent to be pumped from the detergent supply 412 to a reservoir attached to the control box 410. The control box 410 may select different a detergent or combination of detergents, and a different mixing ratio of the selected detergent or combination of detergents and/or water for each individual spray during the cleaning operation.

In other examples, the control box 410 may implement a post-mix operation such that a mixing ratio is controlled via a set of electronically-controlled valves to meter the water supply and one or more of the detergent supplies 412(1)-(2) such that they are mixed at the point they enter the conduit 420 according to a target mixing ratio. The control box 410 may control the set of valves to independently set a mixing ratio for each individual zone.

In some examples, the control box 410 initiates a cleaning operation on a zone-by-zone basis using the conduit 420, the conduit 422, and/or the conduit 424. In some examples, the control box 410 is limited to causing one zone to be cleaned at a time, with one or more of the zones cleaned sequentially. That is, once a cleaning operation with one zone is complete, the control box 410 may initiate a cleaning operation on a second zone according to a cleaning schedule, and once the cleaning operation for the second zone complete, a cleaning operation for a third zone (if applicable) may be initiated. The process may continue to repeat for fourth, fifth, etc. zones. The control 410 may support programming to clean any number of different zones of a cooking range exhaust system 401, such as 4, 5, 6, 7, 8, or more zones. In other examples, two or more zones may be cleaned contemporaneously. In some examples, two zones with common target detergent-to-water ratios may be cleaned contemporaneously. A determination of a number of zones capable of being cleaned contemporaneously may be based available supply water volume and pressure, pump capacity, duration of the cleaning operation, and cleaning solution (e.g., water and detergent mixture) volume and pressure for selected zones. In some examples, cleaning of the waste conduit 430 and/or the drain or waste reservoir 416 may be performed less frequently than cleaning of the exhaust system and may constitute more of a flush than a spray application.

The respective cleaning operation for each zone may be individually configured independent of other zones. For example, for a single cleaning operation of a particular zone, the control box may be programmed to specify number of spray or flush cycles, a duration of each spray or flush cycle, a detergent or combination of detergents, a mixing ratio of the selected detergent or combination of detergents and/or water, a number of and duration of each water rinse spray cycle, or any combination thereof. The control box 410 may be further programmed to specify a schedule for a particular cleaning operation in each zone, such as specifying performance of cleaning operations on specific days, excluding cleaning operation on specific days, scheduling cleaning operations after a set number of days or weeks, etc., or any combination thereof.

In some examples, the system 400 may include sensors (e.g., cameras or other sensors) (not shown) capable of detecting the film on the surfaces of the cooking range exhaust system 401. In some examples, the control box 410 may periodically receive data from the sensors indicating a level of film deposit and may determine whether to schedule a cleaning operation based on the data. In some examples, rather than being purely time-based, the control box 410 may end a cleaning operation in response to data from the sensors indicating that the surfaces of the cooking range exhaust system 401 are sufficiently clean. In some examples, the control box 410 may determine whether a completed cleaning operation was successful based on the data from the sensors. In some examples, the control box 410 may provide the sensor data to a backend system to be analyzed and stored.

In some examples, the control box 410 may further include other sensors configured to detect an empty one of the detergent supplies 412(1)-(2) (e.g., based on characteristics of the detergent pump operation and/or pressure or flow sensors in the detergent lines), a lack of a water supply (e.g., pressure or flow sensors in the water supply inlet 414), water supply quality, whether one of the conduits 420, 422, and/or 424 and/or corresponding spray nozzles are clogged, etc. In some examples, the control box 410 may include a display, lights, and/or a speaker 411 to provide visual and/or aural alerts to a user (e.g., customer, technician, etc.) that there is a problem with the system, such as one of the detergent supplies 412(1)-(2) being low or empty, lack of water supply from the water supply inlet 414, one of the conduits 420, 422, and/or 424 and/or corresponding spray nozzles are clogged, etc.

In some examples, the control box 410 be communicatively coupled to or more nozzle sensors 442, 444, 450 for monitoring performance of the nozzles. In some examples, the nozzle sensors are pressure sensors, flow rate sensors, or any type of sensor disclosed herein. The control box 410 may receive nozzle sensor data from the nozzle sensors 442, 444, 450 when the cleaning system is performing a cleaning operation. In some examples, the control box 410 may determine whether nozzles are clogged based on the data from the nozzle sensor and a threshold sensor value. The location of the nozzle sensors 442, 444, 450 may collect nozzle sensor data regardless of which zone is being cleaned. For example, the nozzle sensor may be proximal a pump of the control box 410 (see, e.g., sensor 222 of FIG. 2), such that all cleaning solution passes by the nozzle sensor before being directed to a zone or a specified zone. Accordingly, nozzle sensor may monitor the nozzles of the entire system 400, with any cleaning solution. In some examples, the control box may provide the nozzle sensor data to a backend system to be analyzed and stored. Alternatively, the nozzle sensors 442, 444, 450 may be coupled to respective conduits associated with the nozzles to be analyzed. For instance, the nozzle sensor 442 may be arranged on conduit 420 proximate to nozzles **426*a*-426*f* in the hood 403 and the nozzles 448*a*-448*c* in the flue 404 such that the nozzle sensor 442 senses flow information for these nozzles. The nozzle sensor 444 may be arranged on a branch 421 of the conduit 420 proximate to nozzles 448*a*-448*c* in the flue 404, and downstream of the nozzles 446*a*-446*f* such that the nozzle sensor 444 does not sense flow information of these nozzles. The nozzle sensor 450 may be arranged on the conduit 424 proximate the nozzle(s) 423 in the trough 425 of the hood 403 and may sense flow information of only these nozzles 423**.

In some examples, the control box 410 may be communicatively coupled to one or more conduit sensors 452, 454 for monitoring performance of the conduits, such as conduit 424 configured for carrying detergent and/or water to the waste reservoir 416 and/or conduit 430 configured for carrying cleaning waste through the waste collection system. The conduit 424, 430 may not necessarily be fluidly coupled to a nozzle. The conduit 424 may be fluidly coupled to the system pump and terminate at the reservoir 416, while the conduit 430 may be fluidly coupled to the trough 425 and terminate at the reservoir. In some examples, the conduit sensors 452, 454 are pressure sensors, flow rate sensors, or any type of sensor of the present disclosure. For instance, the conduit sensor 452 may be a pressure sensor, while the conduit sensor 454 may be a flow rate sensor. The control box 410 may receive conduit sensor data from the conduit sensors 450, 452 when the cleaning system is performing a cleaning operation for cleaning the waste reservoir 416 by delivering detergent and/or water thereto.

In some examples, the control box 410 may be communicatively coupled to one or more vessel sensors 456, 458 for monitoring performance of the trough 425 and waste reservoir 416, respectively. Vessel sensor 456 may be arranged in the trough 425 and may be actuated by a buildup of cleaning waste as it fills the trough 425. Vessel sensor 458 may be arranged in the waste reservoir 416 and may be actuated by a buildup of cleaning waste as it fills the waste reservoir 416. The vessel sensors 456, 458 may be level sensors such as float sensors (e.g., float switches), optical sensors, flow rate sensors, or any type of sensor of the present disclosure. The control box 410 may receive vessel sensor data from the vessel sensors 456, 458, for instance periodically, such as when the cleaning system is performing a cleaning operation for cleaning the trough 425 and/or waste reservoir 416 by delivering detergent and/or water thereto.

The control box 410 may be configured to provide data related to operation of the system 400, such as cycles completed, cycle duration, amount of detergent used, sensed film deposit data, nozzle operation, nozzle operation status, conduit operation, conduit operation status, vessel operation, vessel operation status, etc., or any combination thereof. The information may be stored in a database. The database may also include inspection data that indicates whether the cleaning operations are meeting expected standards. The database may be used to provide alerts if cleaning operations need to be adjusted for not meeting expected standards. The database may also be used to provide alerts if received data indicates that operation of a particular automated cooking range exhaust cleaning system is not as expected, such as missing scheduled cleaning operations, duration of an operation is not as expected, more or less detergent is being used than expected, etc., or any combination thereof. The database may also provide alerts if the nozzle operation reaches a threshold sensor value, indicating the threshold number of nozzles are clogged. In another example, the database may provide a nozzle operation status, which indicates how many nozzles are clogged. The nozzle operation status may be provided before the number of clogged nozzles reaches the threshold sensor value to trigger an alert. In another example, the nozzle operation status will periodically be provided, such as when the cleaning operation is running, regardless of whether the threshold sensor value is reached. The database may also provide alerts if the conduit sensor reaches a threshold sensor value, indicating the threshold level of the conduit is clogged. In another example, the database may provide a conduit status, which indicates how much of the conduit clogged. The conduit operation status may be provided before the clogged conduit reaches the threshold sensor value to trigger an alert. In another example, the conduit operation status will periodically be provided, such as when the cleaning operation is running, regardless of whether the threshold sensor value is reached. In another example, the database may provide a vessel status, which indicates how full the vessel is. The vessel operation status may be provided before the filling vessel reaches the threshold sensor value to trigger an alert. In another example, the vessel operation status will periodically be provided, such as when the cleaning operation is running, regardless of whether the threshold sensor value is reached. The vessel status may include a rate of change of drainage status over time and for instance may be used to determine overall system performance. In some cases, the amount of fluid received by the vessel 416 on a periodic basis, e.g., daily basis, may be a diagnostic of system performance, and more or less fluid than a threshold value of fluid may be indicative of service needs. In addition to the alerts provided by the display, lights, and/or a speaker 411, database may also be used to provide alerts to users (e.g., customers, technicians, etc.) if received data indicates a problem with the system, such as one of the detergent supplies 412(1)-(2) being low or empty, lack of water supply from the water supply inlet 414, one of the conduits 420, 422, and/or 424 and/or corresponding spray nozzles are clogged, the system is not cleaning as expected (e.g., missing scheduled cleaning operations, duration of an operation is not as expected, more or less detergent is being used than expected, etc.), or any combination thereof.

It is appreciated that the system 400 and the cooking range exhaust system 401 are exemplary, and that the components of the system 400 and/or the cooking range exhaust system 401 may be arranged differently, or may include fewer or additional components, without departing from the scope of the disclosure.

Figure 5:
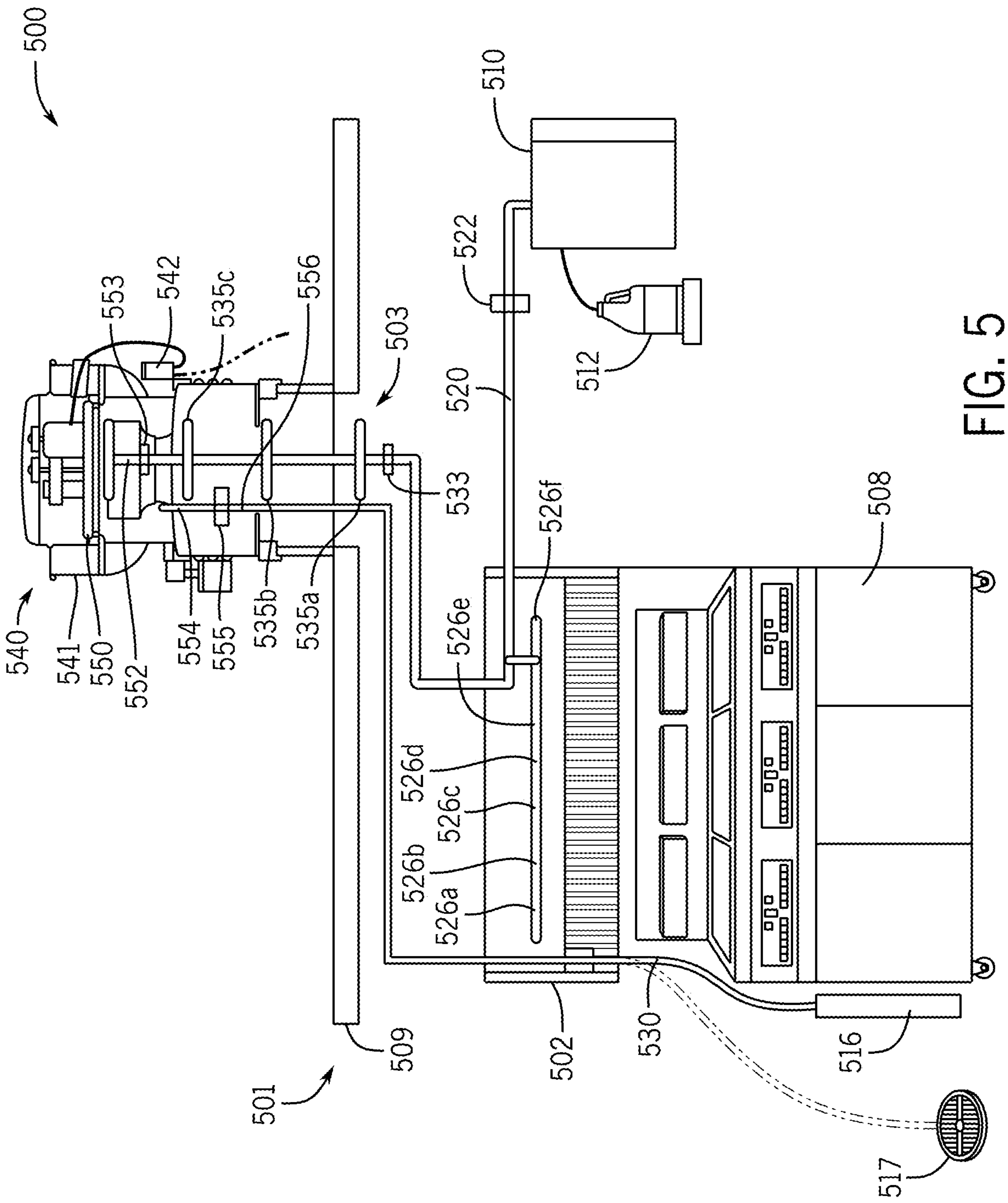
FIG. 5 depicts a diagram illustrating an exemplary automated range exhaust cleaning system configured to clean deposited film from surfaces of a cooking range exhaust system (e.g., including a backsplash, a hood, a flue, an externally mounted kitchen hood exhaust fan (exhaust fan) and any connecting pipes or conduit) according to implementations of the present disclosure.

FIG. 5 depicts diagrams illustrating an exemplary automated range exhaust cleaning system 500 configured to clean deposited film from surfaces of a cooking range exhaust system 501 (e.g., including a hood 502, a flue 503, an externally mounted kitchen hood exhaust fan (exhaust fan) 540 and any connecting pipes or conduit) according to implementations of the present disclosure. The automated range exhaust cleaning system 500 includes a cleaning system control box 510, a detergent supply 512, a waste reservoir 516, and conduit 520. The cooking range exhaust system 501 may remove or exhaust cooking effluent (e.g., smoke, odors, grease, other types of cooking effluent, etc.) away typical kitchen cooking equipment, such as fryers, cooking ranges or other kitchen appliances 508. Over time, grease and other particles that are entrained in the exhaust effluent may be deposited on the surfaces of the hood 502, the flue 503, components of the exhaust fan 540, etc., to form a film. The automated range exhaust cleaning system 500 may be configured to automatically clean the film from the cooking range exhaust system 501, which may include application of a degreasing solution. In some examples, the automated range exhaust cleaning system 500 is only configured to clean inside surfaces of the cooking range exhaust system 501 (e.g., inside of the hood 502, the flue 503, and the fan 540, but not the outside surfaces of the hood 502, the flue 503, or the exhaust fan 540). In some examples, the exhaust fan 540 may be configured to implement a separate cleaning operation independent of other components of the kitchen.

Generally, the automated range exhaust cleaning system 500 includes a spray system with conduit 520 disposed in, on, or proximate to parts of the cooking range exhaust system 501, including the hood 502, the flue 503, or the exhaust fan 540, and may be arranged to spray surfaces with a detergent solution and/or water. In some examples, the conduit 520 may include two or more zones of independently activated or controlled groups of nozzles. In some examples, the zones may each have an independent set of pipes. In other examples, the zones may share some pipes with other zones, yet the nozzles are independently activated or controlled.

The cleaning system control box 510 may be configured to control operation of the automated range exhaust cleaning system 500, including cleaning operation parameters or configurations for individual zones of the conduit 520. In some examples, the cleaning system control box 510 may be programmed to control, on a zone-by-zone basis, scheduling and manage cleaning operations. The cleaning system control box 510 may be programmed to monitor the status and operation of the nozzles. The cleaning system control box 510 may include a wireless and/or a wired interface to facilitate configuration of the cleaning system control box 510 by an external device to control operation of the automated range exhaust cleaning system 500 according to specified settings.

The spent cleaning solution and film debris removed from the cooking range exhaust system 501 may drain via a waste conduit 530 to a waste reservoir 516, which may be emptied as necessary. In some examples, the waste conduit 530 may connect directly to a common drain 517 (e.g., rather than to the waste reservoir 516) configured to receive other wastewater from the kitchen operations.

As noted above, the exhaust fan 540 may be integrated in with the automated range exhaust cleaning system 500, such that the automated range exhaust cleaning system 500 also performs cleaning operations on the exhaust fan 540. The exhaust fan 540 may be located outdoors on a roof 509 of a building, in some examples. In other examples, the exhaust fan 540 may be installed on an outside wall of a building. Specific design elements for portions of the automated range exhaust cleaning system 500 within the exhaust fan 540 may include spray nozzles 550 within the fan housing 541 targeted to clean key elements of the exhaust fan 540 while minimizing electrical and corrosive impact on the exhaust fan, integrated plumbing (e.g., supply lines 552 and waste collection system 554) and operational control (e.g., via an exhaust fan control box 542) with a remotely located control box 510 for dispensing detergent that is part of the automated range exhaust cleaning system 500, and elements to enable easy service and cleaning of the exhaust fan 540.

Because the exhaust fan 540 is implemented to pull steam and smoke entrained with grease and other contaminants up through the hood 502 and flue 503, it may develop a film of grease on components of the exhaust fan 540 that come into contact with the steam and smoke entrained with grease and other contaminants. In addition, certain portions of the exhaust fan 540 may be contaminated by external elements by virtue of being placed outdoors and exposed to natural elements. Thus, integration of the exhaust fan 540 into the automated range exhaust cleaning system 500 may increase efficiency and frequency in an ability to clean the exhaust fan 540 (e.g., the fan blades, fan shaft, motor housing, fan housing 541, etc.) as compared with exhaust fans that require manual cleaning (e.g., in-situ accessing and cleaning on a rooftop).

Figure 6C:
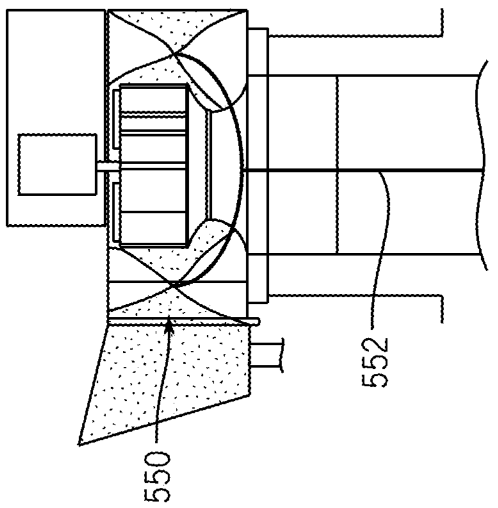
FIGS. 6A-6D provide four different examples of integration of the conduit and nozzles into two different types of exhaust fans according to the present disclosure.
Figure 6D:
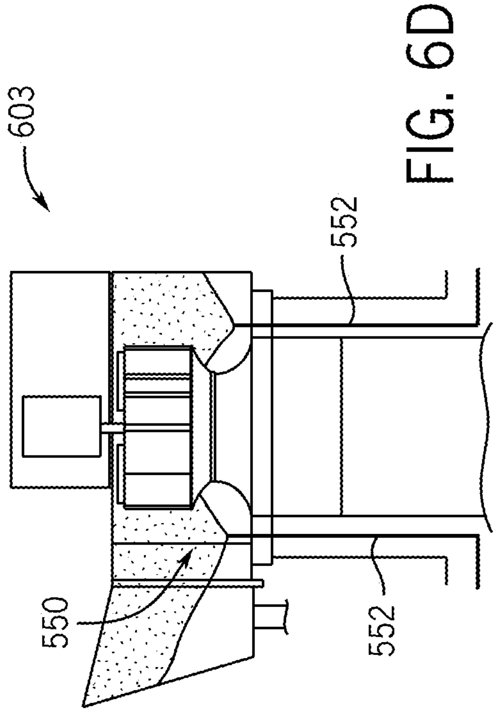
Figure 6A:
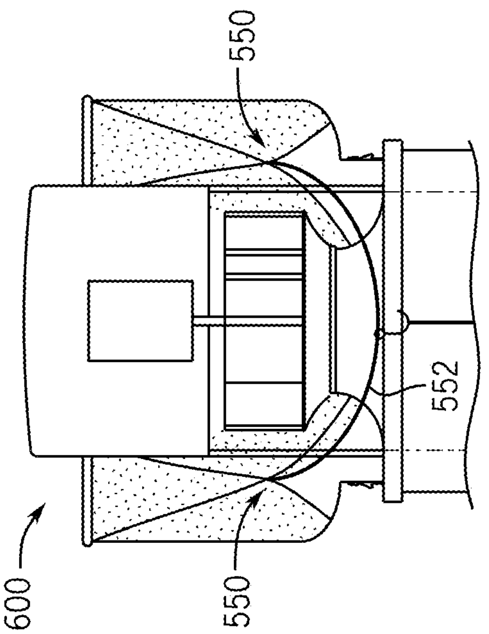
Figure 6B:
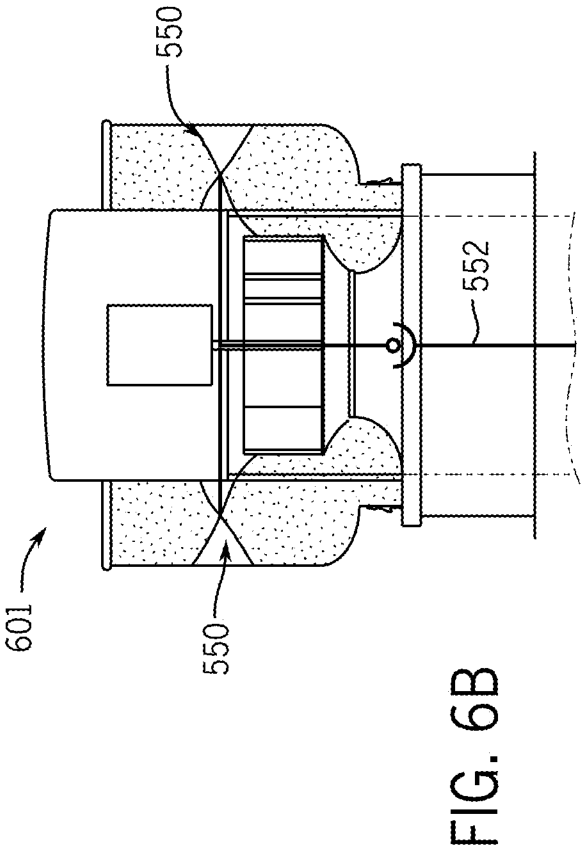

In some embodiments, to integrate with the automated range exhaust cleaning system 500, the exhaust fan 540 includes a spray system with conduit 552 and nozzles 550 disposed in the exhaust fan 540 arranged to spray surfaces of the exhaust fan 540 with a detergent solution and/or water. The conduit 552 and nozzles 550 may be integrated into the exhaust fan 540 in various different implementations. For example, FIGS. 6A-6D provide four different examples 600-603 of integration of the conduit 552 and nozzles 550 into two different types of exhaust fans, in accordance with examples described herein. Example 600 of FIG. 6A depicts an implementation where the chemical delivery conduit is routed internal to flue and outside of any rotating fan part of a first type of exhaust fan 540, with the nozzles being positioned in the outer housing and spraying horizontally. Example 601 of FIG. 6B depicts an implementation where the chemical delivery conduit 552 is routed internal to the flue and through a hollow motor shaft of the first type of the exhaust fan 540 on which the fan blades are mounted with the nozzles 550 being disposed to the sides of the exhaust fan 540 and spray vertically in the fan housing 541. In some examples, the connection between chemical supply conduit in the flue 503 and the chemical delivery conduit 552 in the exhaust fan 540 in one or both of the examples 600 and 601 are able to be easily disconnected and reconnected (e.g., via self-sealing gaskets, pressure fittings, or other types of connections, etc.) when housing of the exhaust fan 540 is opened for service or cleaning an outer housing of the first type of the exhaust fan 540. Example 602 of FIG. 6C depicts an implementation where the chemical delivery conduit is routed internal to flue 503 and outside of any rotating fan part of a second type of the exhaust fan 540, with the nozzles 550 being positioned in the outer housing and spraying horizontally. Example 603 of FIG. 6D depicts an implementation where the chemical supply conduit is routed external to flue and outside a lower pedestal of the second type of the exhaust fan 540, with the nozzles being positioned to spray vertically into the exhaust fan 540. In some examples, the connection between chemical supply conduit in the flue and the chemical supply conduit in the exhaust fan 540 in one or both of the examples 602 and 603 are able to be easily disconnected and reconnected (e.g., via self-sealing gaskets, pressure fittings, or other types of connections, etc.) when housing of the exhaust fan 540 is opened for service or cleaning an outer housing of the second type of the exhaust fan 540.

Figure 7A:
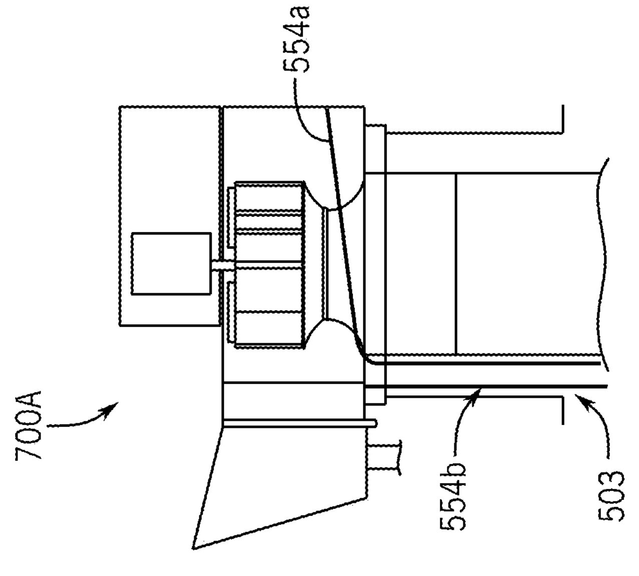
FIGS. 7A-7C provide three different examples of implementations of the waste collection system of the exhaust fans according to the present disclosure.
Figure 7B:
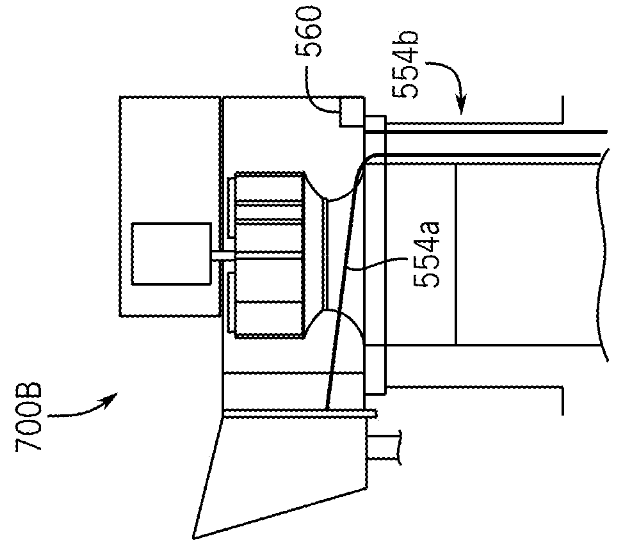
Figure 7C:
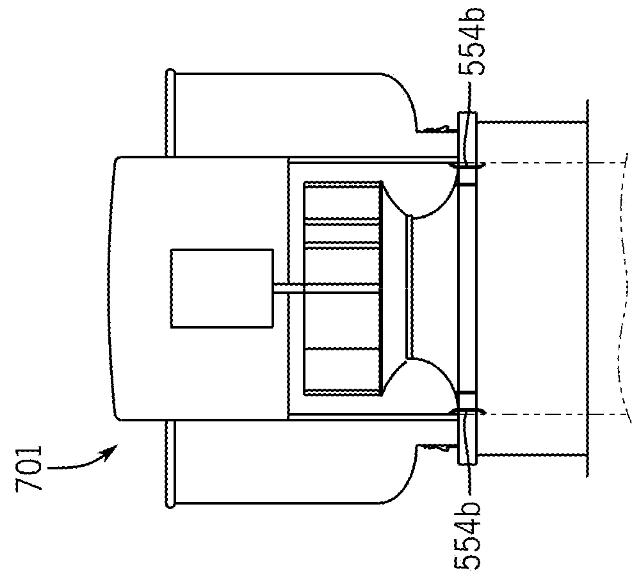

In some examples, the exhaust fan 540 may further include the waste collection system 554 that is configured to cause deposited cleaning solution and flush water to be collected and directed to a drain system (e.g., 516, 530) of the automated range exhaust cleaning system 500 or a separate drain system used by the exhaust fan 540. The waste collection system may facilitate removal of detergent and flush water without contaminating or creating messes in other portions of the kitchen. In some installations, the mounting surface for the exhaust fan may be uneven, with one or more sides having an up-slope away from the fan and other one or more sides having a downslope away from the fan. Thus, in order to facilitate proper drainage regardless of the orientation of the exhaust fan 540 relative to a slope of an external mounting surface (e.g., a roof), a location of the slope and a drain port for the exhaust fan 540 can be independently positioned or selected relative to the exhaust fan control box 542 or a fan hinge. In some examples, the exhaust fan 540 may have multiple drain ports arranged around the sides of the fan, and during installation, one or more of them may be connected to an external drain based on which drain port or ports are near a down slope of the external mounting surface. In other examples, orientation of the drain port may be configurable separate from installed orientation of the exhaust fan 540 to facilitate drain egress near a down slope of the external mounting surface. FIGS. 7A-7C provide three different examples 700A, 700B, and 701 of implementations of the waste collection system 554 of FIG. 5, in accordance with examples described herein. Example 700A of FIG. 7A depicts an implementation where the waste collection system 554 includes a sloped floor *554a* that slopes in a first direction and a drain conduit 554*b* that flows outside of a first side of the flue 503 and down to a drain or reservoir. Example 700B of FIG. 7B depicts an implementation where the waste collection system 554 includes a sloped floor 554*a* that slopes in a second direction (opposite the slope in the first direction in example 700A) and a drain conduit 554*b* that flows outside of down a second side (opposite the first side shown in example 700A) of the flue 503 and down to a drain or reservoir. It is appreciated that sloped floors depicted in the examples 700A and 700B are exemplary, and a sloped floor could be implemented in any other direction (e.g., front-to-back, back-to-front, side-to-side, etc.) without departing from the scope of the disclosure. Example 701 of FIG. 7C depicts an implementation where the waste collection system 554 includes drain conduits 554*b* that allows drainage back down the flue to a drain or reservoir.

In some examples, the exhaust fan 540 may include the exhaust fan control box 542 configured to independently or in communication with (using wired or wireless communication) the cleaning system control box 510, initiate, control, monitor, or manage cleaning of the exhaust fan 540. In some examples, the exhaust fan control box 542 may be integrated with or positioned proximate the exhaust fan 540 (as shown in FIG. 5). In other examples, the exhaust fan control box 542 may be integrated with the cleaning system control box 510. The exhaust fan control box 542 may include programmable controllers, switching circuitry, power supplies, and other logic and circuitry configured to perform functions associated with operation of the exhaust fan 540, generally, and/or operation of the exhaust fan 540 during a cleaning operation. In some examples, the exhaust fan control box 542 may include a microcontroller and a memory that is programmed with instructions to control or perform methods or operation described herein. In some examples, the exhaust fan control box 542 includes a programmable logic controller (PLC) configured to be programmed to control or perform methods or operations described herein. In some examples, the exhaust fan control box 542 may control operation of the exhaust fan 540 during a cleaning operation (e.g., cut or modify power to the exhaust fan 540 or reduce fan speed of the exhaust fan 540 during the cleaning operation and/or restore power once cleaning is complete), initiate or manage a cleaning operation on the exhaust fan 540, report power status of or an issue with the exhaust fan 540, etc.

Figure 8A:
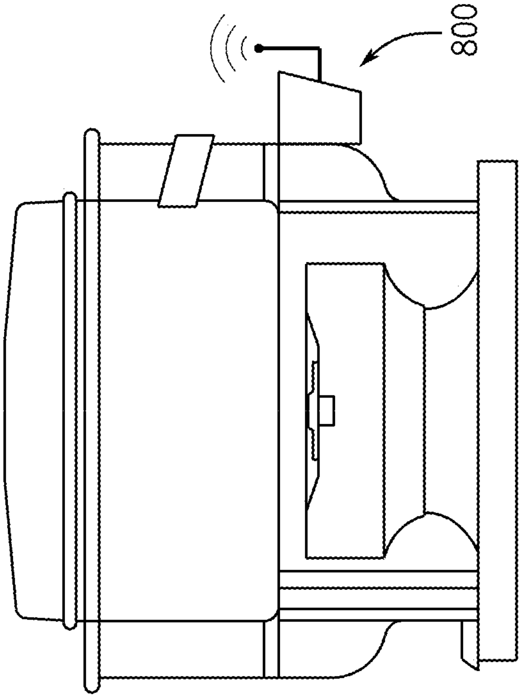
FIGS. 8A and 8B provide two different examples of implementations of the exhaust fan control box according to the present disclosure.
Figure 8B:
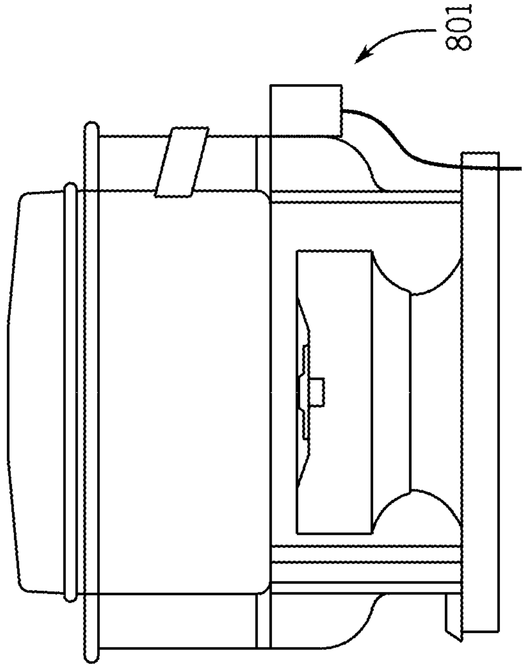

FIGS. 8A and 8B provide two different examples 800 and 801 of implementations of the exhaust fan control box 542, in accordance with examples described herein. Example 800 of FIG. 8A depicts an implementation where the exhaust fan control box uses wireless communication (e.g., Wi-Fi®, Bluetooth®, 4G, 5G, other short wave communication protocols, etc.) to communicate with the cleaning system control box 510 or other external devices. Example 801 of FIG. 8B depicts an implementation where the exhaust fan control box 542 uses wired communication to communicate with the cleaning system control box 510 or other external devices. As noted above, in yet other examples, the exhaust fan control box 542 may be integrated in with the cleaning system control box 510.

In some examples, the exhaust fan 540 may include a cut-off switch (attached to the housing 541) and/or a power brake (attached to the motor or the fan blade shaft) that causes power to be cut or modified to the exhaust fan 540 and/or causes the fan blades to stop or slow spinning when the housing 541 is about to be removed or has been at least partially removed. The cut-off switch may be used by (and/or integrated with) the exhaust fan control box 542 or the cleaning system control box 510 to cut or modify power to the exhaust fan 540, in some examples. In some examples, the exhaust fan control box 542 may be limited to selectively connecting exhaust fan 540 components to a source of power via the cut-off switch. In some examples the cleaning system control box 510 is configured to control connection and disconnection of power to the exhaust fan 540. In some examples, one or both of the exhaust fan control box 542 and the cleaning system control box 510 may selectively modify power to the exhaust fan 540, for instance by reducing power to the fan to thereby reduce a fan velocity. The power may be reduced by 25 to 75%, such as about 50% or may be reduced by an amount that reduces the fan velocity to a target rate, such as 25% to 75% or about 50% of the base fan velocity rate. Reducing fan velocity may enable the exhaust fan 540 to continue to remove fumes and smoke from the exhaust system while operating at a speed that enables the fan 540 to be cleaned.

Figure 9:
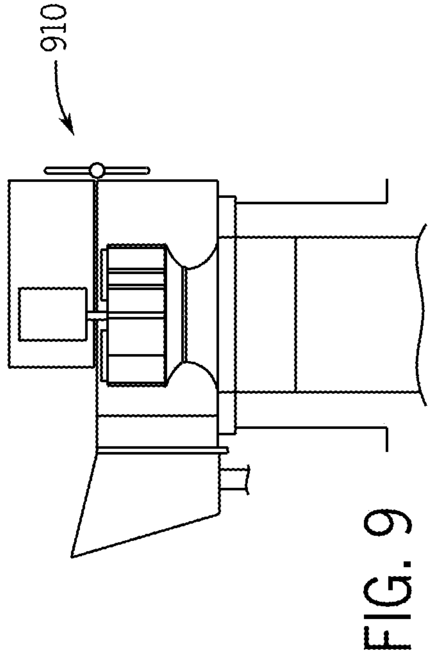
FIG. 9 provides an example of the exhaust fan with a cut-off switch according to the present disclosure.
Figure 13B:
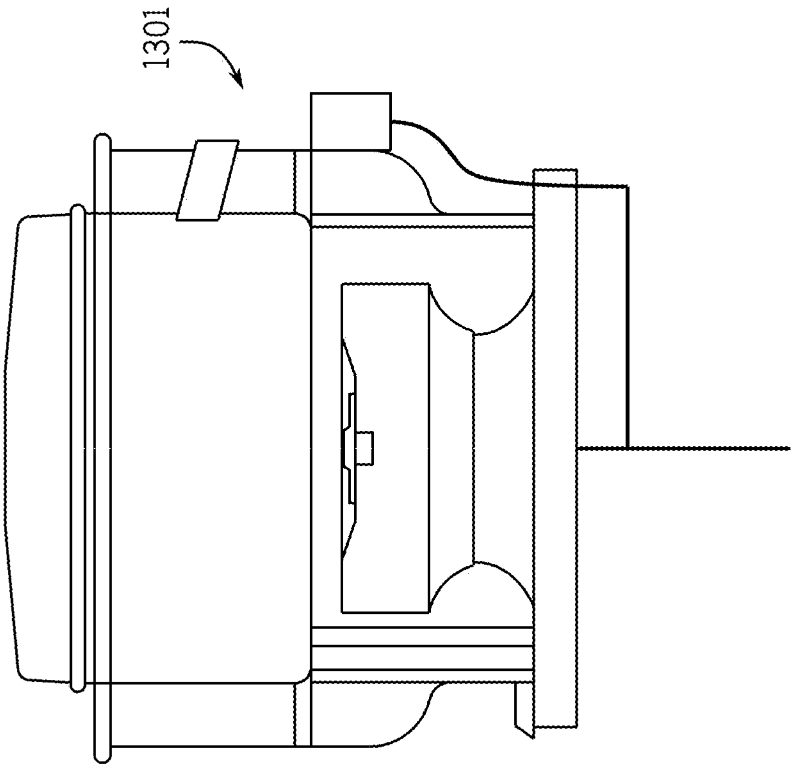
FIGS. 13A and 13B, respectively, provide an example of the exhaust fan with a sensor and an example of the sensor connected to the exhaust fan control box according to the present disclosure.
Figure 13A:
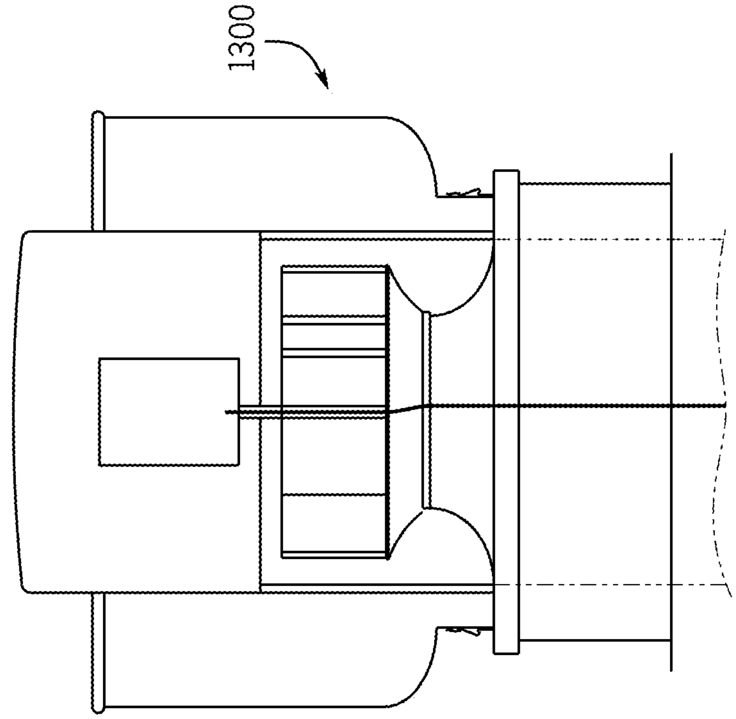

FIG. 9 provides examples of a removable shroud of the exhaust fan, in accordance with examples described herein. In the example 900, the switch 910 is configured to cut off power to the exhaust fan when the housing is at least partially removed. In some examples, the exhaust fan 540 may include a sensor (e.g., pressure, moisture, conductivity, etc.) sensor that is configured to detect when a cleaning operation has started, and the exhaust fan control box 542 may receive an indication from the sensor that the cleaning operation has started, and may cut or modify power to the exhaust fan motor (e.g., via the cut-off or kill switch or via circuitry of the exhaust fan cleaning system control box 542). FIG. 13A provides an example 1300 of the exhaust fan 540 with a sensor, and FIG. 13B provides an example 1301 of the sensor connected to the exhaust fan control box, in accordance with examples described herein. In some examples, an additional sensor or plurality of sensors may be mounted inside the exhaust fan 540 and may be used to detect whether the exhaust fan 540 needs to be cleaned. For example, the sensor may include a current sensor to detect power to operate the exhaust fan 540 or a torque sensor to detect torque to operate the exhaust fan 540 (e.g., increased current or torque may indicate a dirty exhaust fan 540), an accelerometer that may detect vibration (e.g., excessive vibration may indicate uneven buildup on the fan blades), etc. In some examples, the exhaust fan control box 542 may communicate to the cleaning system control box 510 that a cleaning needs to take place (e.g., sensor indicates certain characteristic is below or above a predetermined threshold) and cause the cleaning system control box 510 to initiate a cleaning cycle.

Figure 10A:
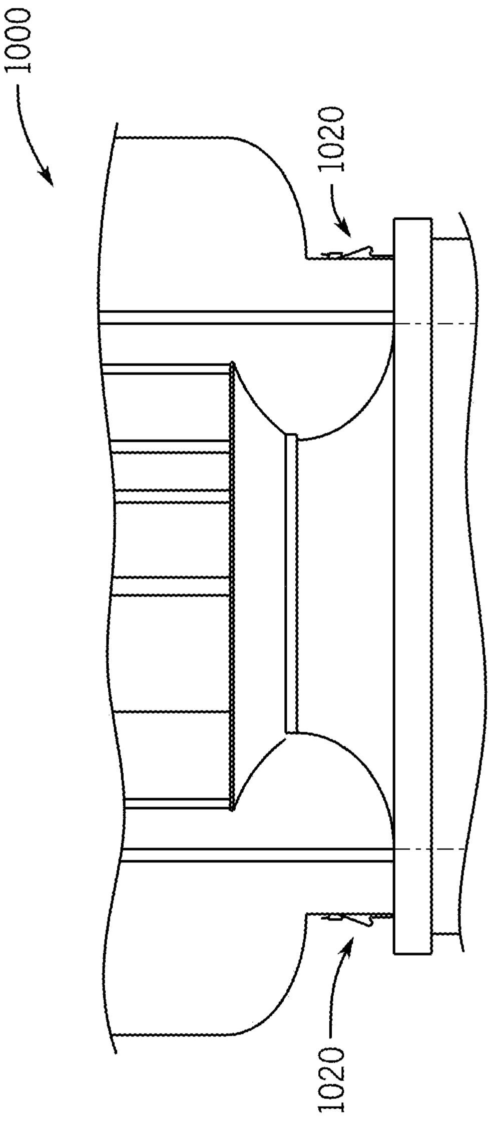
FIGS. 10A-10B provide an example of the exhaust fan with removable clips that may be used to retain the upper portion when installed and allow the upper portion to be removed according to the present disclosure.
Figure 10B:
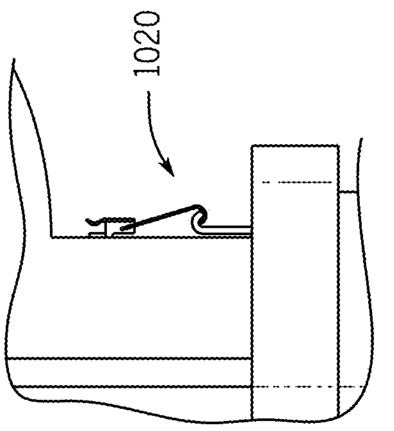
Figure 10C:
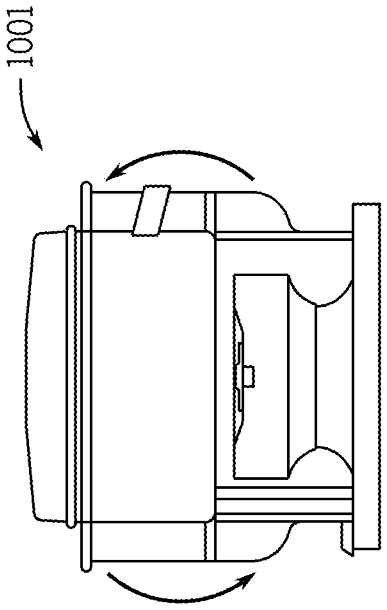
FIG. 10C provides an example of the exhaust fan that may be tilted open to one side via a hinge when they are released or removed according to the present disclosure.

In some examples, the housing 541 of the exhaust fan 540 may be removable to facilitate cleaning of fan blades of the exhaust fan 540. That is, the housing 541 may be removable without impacting the conduit 552, the nozzles 550, or the waste conduit 554. In some examples, the housing 541 may be removed by tilting or rotating to one side on a hinge, once clips holding the housing 541 to a base of the exhaust fan 540 are removed. In other examples, the housing 541 may be twisted to remove or install. FIG. 10 provides examples of a removable shroud of the exhaust fan, in accordance with examples described herein. In the example 1000 of FIG. 10A and the detail view of FIG. 10B, the clips 1020 are configured to retain the housing to the base of the exhaust fan and may be un-fastened to facilitate removal of the housing, either completely, or tilted or rotated to one side via a hinge. In the example 1001 of FIG. 10C, the housing may be removed by twisting or rotating around a longitudinal axis to release the housing.

Figure 12:
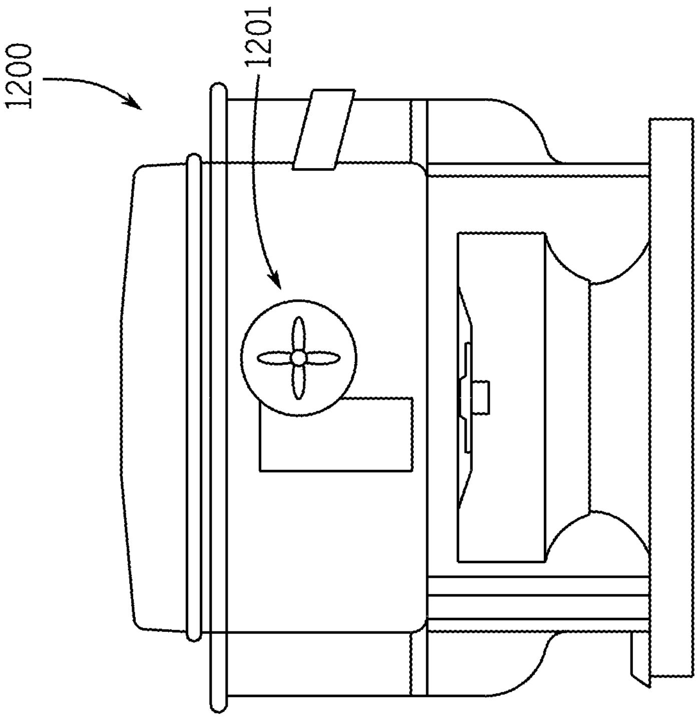
FIG. 12 provides an example of the exhaust fan with a hot air blower to move hot air within the exhaust fan to soften or melt film deposited on fan blades according to the present disclosure.
Figure 11:
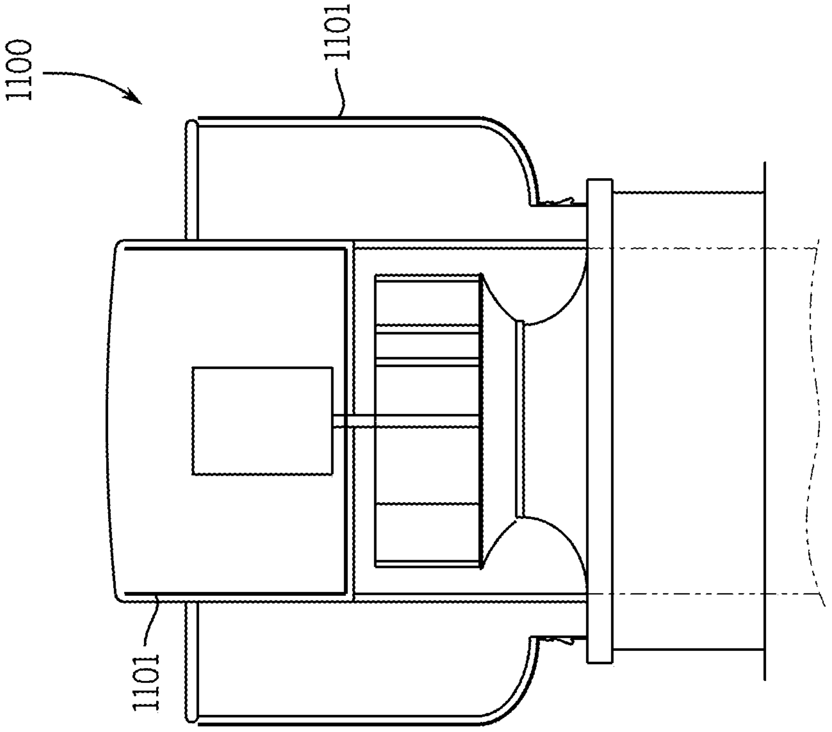
FIG. 11 provides an example of the exhaust fan with heat tape in high impact areas where a film is most likely to form according to the present disclosure.

In some examples, the exhaust fan 540 may include heating elements (e.g., heat tape or a heater) to condition (e.g., soften or melt the film to make it easier to remove) the exhaust fan 540 for cleaning. The heating elements may be controlled by the exhaust fan control box 542, in some examples. In some examples the heating elements may be controlled by the cleaning system control box 510. FIG. 11 provides an example 1100 of the exhaust fan 540 with heat tape 1101 in high impact areas where a film is most likely to form, in accordance with examples described herein. FIG. 12 provides an example 1200 of the exhaust fan 540 with a hot air blower 1201 to move hot air within the exhaust fan 540 to soften or melt film deposited on fan blades according to the present disclosure.

Figure 15:
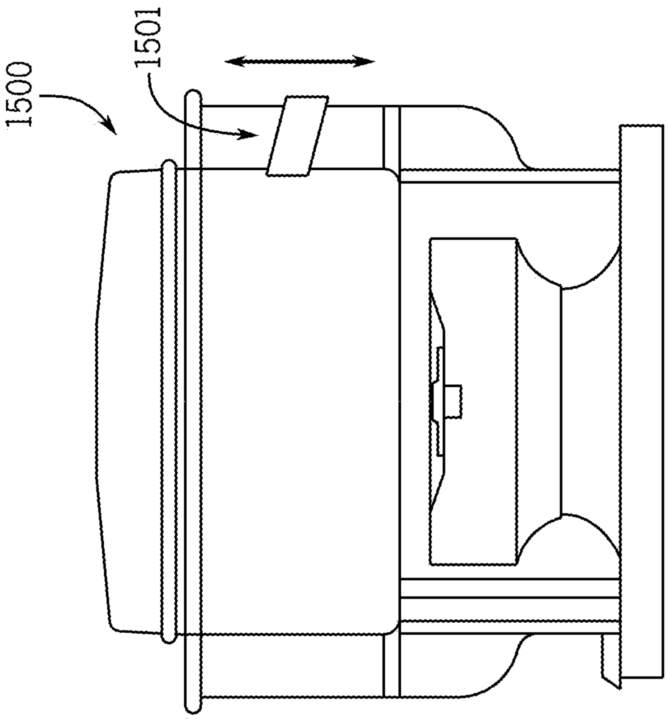
FIG. 15 provides an example of the exhaust fan with circular brush with a circumference that is similar to the inner circumference of the exhaust fan housing that moves up and down (and may spin in some examples) to clean the inner fan housing according to the present disclosure.
Figure 14A:
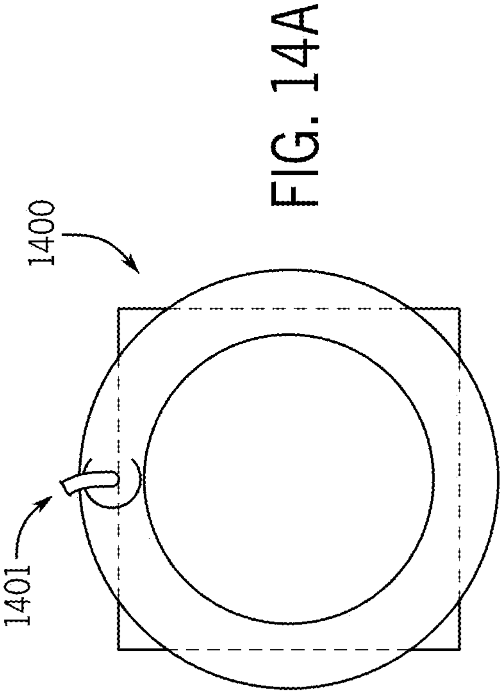
FIGS. 14A and 14B provides an example of the exhaust fan with a mechanical brush that rotates around the fan housing according to the present disclosure.
Figure 14B:
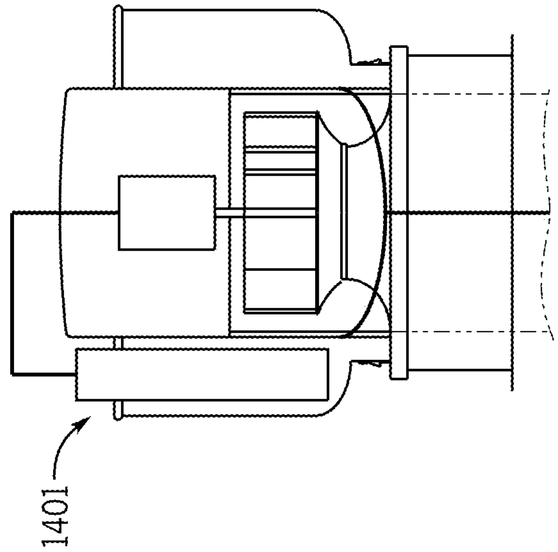

In some examples, the exhaust fan 540 may include automated mechanical cleaning components, in addition to or alternative to the spray nozzles, which are configured to scrub surfaces of the exhaust fan. The automated mechanical cleaning components may be controlled by separate control circuitry, motors, switches, etc. In some examples, control circuitry for the automated mechanical cleaning components may be included in the exhaust fan control box 542 or the cleaning system control box 510. FIGS. 14A and 14B provide top and side views of an example 1400 of the exhaust fan 540 with a mechanical brush that rotates around the fan housing according to the present disclosure. FIG. 15 provides an example 1500 of the exhaust fan 540 with circular brush 1501 with a circumference that is similar to the inner circumference of the exhaust fan 540 housing that moves up and down (and may spin in some examples) to clean the inner fan housing according to the present disclosure. The brush or other mechanical means may be configured to scrub at least one of a wall of the housing or the fan blades of the fan during the exhaust fan cleaning operation.

Figure 16B:
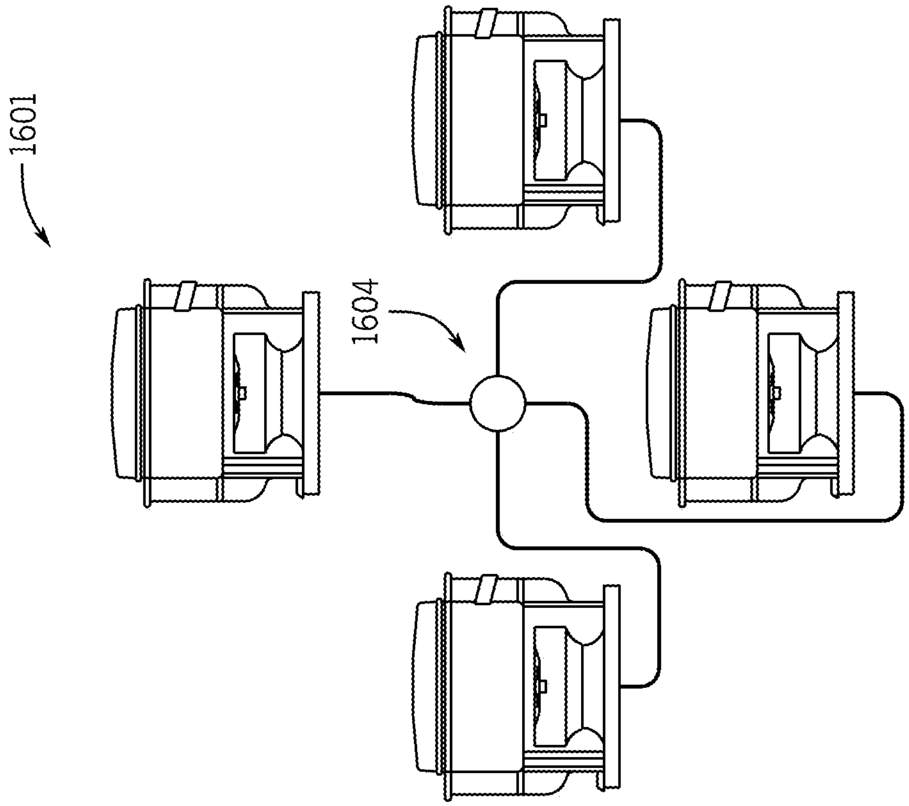
FIGS. 16A and 16B provide two examples of integration of the automated range exhaust cleaning system with multiple exhaust fans according to the present disclosure.
Figure 16A:
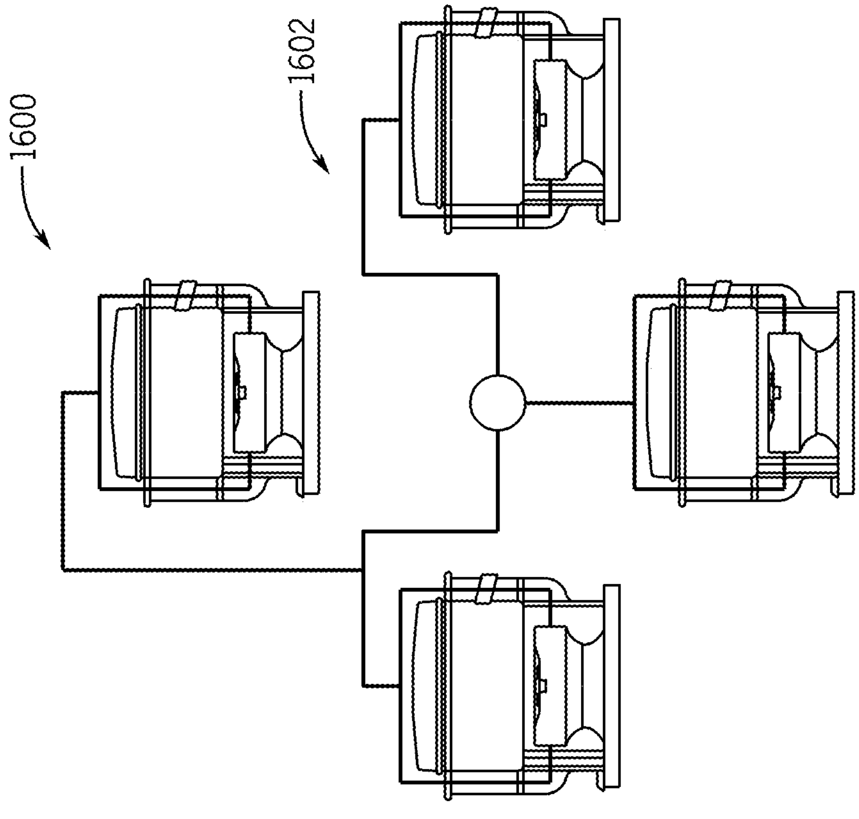

In some examples, the automated range exhaust cleaning system 500 may be integrated with multiple of the exhaust fans 540, such that detergent is provided to a central hub that has switchable valves that are configured to selectively route detergent or flush water to one or more of the exhaust fans 540. FIGS. 16A and 16B provide two examples of integration of the automated range exhaust cleaning system 500 with multiple exhaust fans, in accordance with examples described herein. In the example 1600 of FIG. 16A, the system is configured to route the detergent conduit 1602 on the outsides of the four the exhaust fans, with the hub configured to selectively provide the detergent to any one or more of the exhaust fans. In the example 1601 of FIG. 16B, the system is configured to route the detergent conduit 1604 to the inside bottom of the exhaust fans (and connect to internal spray nozzles and conduit), with the hub configured to selectively provide the detergent to any one or more of the exhaust fans.

Turning to other components of the automated range exhaust cleaning system 500, the cleaning system control box 510 may control output devices and monitor various input and output devices to control a cleaning operation. In some examples, the cleaning system control box 510 may include a microcontroller and a memory or a PLC that is programmed with instructions to control or perform methods or operation described herein.

In some examples, the cleaning system control box 510 initiates a cleaning operation on a zone-by-zone basis. In some examples, the cleaning system control box 510 is limited to causing one zone to be cleaned at a time, with one or more of the zones cleaned sequentially. In some examples, two zones with common target detergent-to-water ratios may be cleaned contemporaneously. A determination of a number of zones capable of being cleaned contemporaneously may be based available supply water volume and pressure, pump capacity, duration of the cleaning operation, and cleaning solution (e.g., water and detergent mixture) volume and pressure for selected zones.

The respective cleaning operation for each zone may be individually configured independent of other zones. The cleaning system control box 510 may be further programmed to specify a schedule for a particular cleaning operation in each zone, such as specifying performance of cleaning operations on specific days, excluding cleaning operation on specific days, scheduling cleaning operations after a set number of days or weeks, etc., or any combination thereof.

In some examples, the automated range exhaust cleaning system 500 may include sensors (e.g., cameras or other sensors) (not shown) (in addition to the sensors in the exhaust fan 540) capable of detecting the film on the surfaces of the cooking range exhaust system 501. Thus, rather than being purely time-based, the cleaning system control box 510 and/or the exhaust fan control box 542 may end a cleaning operation in response to data from the sensors indicating that the surfaces of the cooking range exhaust system 501 are sufficiently clean. In some examples, the cleaning system control box 510 may determine whether a completed cleaning operation was successful based on the data from the sensors. In some examples, the cleaning system control box 510 may provide the sensor data to a backend system to be analyzed and stored.

In some examples, the cleaning system 500 may include a nozzle sensor for monitoring performance of the nozzles. For instance, nozzle sensors 522, 533 and 553 may be substantially similar to nozzle sensors 122, 124, 222, 442, 444 described herein. The control box 510 may receive nozzle sensor data from the nozzle sensors 522, 533 and 553 when the cleaning system is performing a cleaning operation. In some examples, the control box 510 may determine whether any nozzles are clogged based on the data from the nozzle sensors 522, 533 and 553 and a threshold sensor value. In some examples, the control box 510 may provide the nozzle sensor data to a backend system to be analyzed and stored.

For instance, as shown in FIG. 5, the nozzle sensor 522 is coupled to the conduit 520 downstream from the system pump and upstream of the nozzles 526*a*-526*f* in the hood 502. As also shown in FIG. 5, the nozzle sensor 533 is coupled to the conduit 520 between the hood 502 and flue 503 and upstream of the nozzles 535*a*-535*c* arranged in the flue 503. As further shown in FIG. 5, the nozzle sensor 553 is arranged upstream of nozzles 550 arranged in the exhaust fan 540. Accordingly, the nozzle sensors 522, 533 and 553 may be configured to sense fluid characteristics of the fluid flowing through the conduits 520, 552 as the fluid travels to the nozzles. For instance, the nozzle sensor 552 may be configured to sense fluid characteristics of all downstream nozzles, e.g., nozzles 526*a*-526*f*, and 535*a*-535*c*, and 550, while the nozzle sensor 533 may be configured to sense fluid characteristics of nozzles 535*a*-535*c*, and 550 arranged downstream therefrom. For instance, the nozzle sensor 533 may be arranged proximate to nozzles 535*a*-535*c* in the flue 503, and downstream of the nozzles 526*a*-526*f* such that the nozzle sensor 533 does not sense flow information of these nozzles. The nozzle sensor 553 may be arranged proximate to nozzles 550 in the exhaust fan 540, and downstream of the nozzles 526*a*-526*f* and 535*a*-535*c* such that the nozzle sensor 553 does not sense flow information of these nozzles.

In some examples, the cleaning system 500 may include one or more conduit sensors 555 for monitoring performance of the conduit 556 of the waste collection system 554 for carrying cleaning waste and detergent and/or water to the waste reservoir 516. The conduit 556 may be fluidly coupled to a waste collection area of the fan 540 and terminate at the reservoir 516 and may receive detergent and/or water after it has been sprayed from a nozzle. Accordingly, the conduit 556 may carry fluid therethrough by the force of gravity. In some examples, the conduit sensors 555 is a flow rate sensor, or any type of sensor of the present disclosure. The control box 510 may receive conduit sensor data from the conduit sensor 555 when the cleaning system is performing a cleaning operation for cleaning the fan 540.

In some examples, the cleaning system 500 may include one or more vessel sensors 560 for monitoring performance of a waste collection area of the fan 540. Vessel sensor 560 may be arranged in a vessel or trough of the fan 540 and may be actuated by a buildup of cleaning waste as it fills this area. The vessel sensor 560 may be level sensors such as float sensors (e.g., float switches), optical sensors, flow rate sensors, or any type of sensor of the present disclosure. The control box 510 may receive vessel sensor data from the vessel sensor 560, for instance periodically, such as when the cleaning system is performing a cleaning operation for cleaning the fan 540 by delivering detergent and/or water thereto.

The cleaning system control box 110 may be configured to provide data related to operation of the system 100, such as cycles completed, cycle duration, amount of detergent used, sensed film deposit data, nozzle operation, nozzle status, conduit operation, conduit status, etc., or any combination thereof. The information may be stored in a database. The database may also include inspection data that indicates whether the cleaning operations are meeting expected standards. The database may provide alerts if cleaning operations need to be adjusted for not meeting expected standards. The database may also provide alerts if received data indicates that operation of a particular automated range exhaust cleaning system is not as expected, such as missing scheduled cleaning operations, duration of an operation is not as expected, more or less detergent is being used than expected, nozzle operation, nozzle operation status, etc., or any combination thereof.

It is appreciated that the examples of integration of the exhaust fan 540 into the automated range exhaust cleaning system 500 are exemplary, and that the components of the automated range exhaust cleaning system 500, the exhaust fan 540, and/or the cooking range exhaust system 501 may be arranged differently, or may include fewer or additional components, without departing from the scope of the disclosure.

Various illustrative components, blocks, configurations, modules, and steps have been described above generally in terms of their functionality. Persons having ordinary skill in the art may implement the described functionality in varying ways for each particular application, but such implementation decisions should not be interpreted as causing a departure from the scope of the present disclosure.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as previously described.

What is claimed is:

1. A system comprising:

a plurality of nozzles coupled to a conduit and arranged to spray a zone of a cooking range exhaust system with a cleaning solution, the zone corresponding to a hood zone, a flue zone, an exhaust fan zone, a waste collection system zone, or a combination thereof;

a sensor configured to sense movement of cleaning solution to the conduit;

a control box configured to:

in response to receipt of a signal to initiate a cleaning operation of the cooking range exhaust system:

cause the cleaning solution to be provided to the plurality of nozzles via the conduit;

collect a sensor reading from the sensor;

compare the sensor reading to a threshold to determine a nozzle operation status indicating a number of clogged nozzles; and provide the nozzle operation status.

2. The system of claim 1, wherein the sensor is a pressure sensor or a flow rate sensor.

3. The system of claim 1, wherein the control box is further configured to provide an alert in response to the comparison of the sensor reading to the threshold indicating at least one nozzle of the plurality of nozzles is at least partially clogged.

4. The system of claim 1, wherein the control box further comprises a wired or wireless interface configured to provide data corresponding to the cleaning operation.

5. The system of claim 4, wherein the data corresponding to the cleaning operation comprises the sensor reading or the sensor reading compared to the threshold.

6. The system of claim 1, further comprising:

a waste conduit configured to provide runoff from the cooking range exhaust system to a drain or reservoir;

a waste conduit cleaning conduit configured to provide a second cleaning solution to the waste conduit; and a second sensor configured to sense movement of cleaning solution to the waste conduit cleaning conduit, wherein the control box is configured to:

in response to receipt of a second signal to initiate a second cleaning operation of the waste conduit:

cause the cleaning solution to be provided to the waste conduit via the waste conduit cleaning conduit;

collect a second sensor reading from the second sensor; and compare the second sensor reading to a second threshold.

7. The system of claim 1, further comprising:

a waste conduit configured to provide runoff from the cooking range exhaust system to a drain or reservoir;

a second sensor configured to sense movement of fluid through the waste conduit, wherein the control box is configured to:

cause the runoff to be provided to the waste conduit;

collect a second sensor reading from the second sensor; and compare the second sensor reading to a second threshold.

8. The system of claim 1, further comprising:

a waste vessel configured to receive cleaning solution runoff from the cooking range exhaust system via a conduit;

a second sensor configured to a level of fluid in the waste vessel, wherein the control box is configured to:

cause the cleaning solution runoff to be provided to the waste vessel;

collect a second sensor reading from the second sensor; and compare the second sensor reading to a second threshold.

9. A method, comprising:

in response to receipt of a signal to initiate a cleaning operation of a cooking range exhaust system:

causing a cleaning solution to be provided to at least one nozzle via a conduit, the at least one nozzle coupled to the conduit and configured to spray a zone of the cooking range exhaust system, the zone corresponding to a hood zone, a flue zone, an exhaust fan zone, a waste collection system, or a combination thereof;

collecting a sensor reading from a sensor configured to sense movement of cleaning solution to the conduit;

comparing the sensor reading to a threshold to determine a nozzle operation status indicating a number of clogged nozzles; and providing the nozzle operation status.

10. The method of claim 9, wherein the sensor reading is a pressure reading or a flow rate reading.

11. The method of claim 9, further comprising proving an alert in response to the comparison of the sensor reading to the threshold indicating a nozzle of the at least one nozzle is at least partially clogged.

12. The method of claim 9, further comprising providing data corresponding to the cleaning operation to a remote device via a wired or wireless interface.

13. The method of claim 12, wherein the data corresponding to the cleaning operation comprises the sensor reading or the sensor reading compared to the threshold.

14. The method of claim 9, further comprising:

in response to receipt of a second start signal to initiate a second cleaning operation of a waste conduit configured to provide runoff from the cooking range exhaust system to a drain or reservoir:

causing the cleaning solution to be provided to the waste conduit via a waste conduit cleaning conduit;

collecting a second sensor reading from a second senor configured to sense movement of cleaning solution to the waste conduit; and comparing the second sensor reading to a second threshold.

15. The method of claim 9, further comprising:

causing cleaning solution runoff to be provided to a waste conduit;

collecting a second sensor reading from a second sensor configured to sense movement of the cleaning solution runoff through the waste conduit; and comparing the second sensor reading to a second threshold.

16. The method of claim 9, further comprising:

causing cleaning solution runoff to be provided to a waste vessel;

collecting a second sensor reading from a second sensor configured to a level of the cleaning solution runoff in the waste vessel; and comparing the second sensor reading to a second threshold.

17. At least one non-transitory tangible machine-readable medium including instructions that, when executed by processing circuitry, cause the processing circuitry to:

cause a cleaning solution to be provided to a plurality of nozzles via a conduit, the plurality of nozzles configured to spray a hood, a flue, an exhaust fan, a waste collection system, or a combination thereof of a cooking range exhaust system;

collect a sensor reading from a sensor configured to sense movement of cleaning solution to the conduit;

compare the sensor reading to a threshold to determine a nozzle operation status indicating a percentage of clogged nozzles; and provide the nozzle operation status.

18. The at least one machine-readable medium of claim 17, wherein the instructions further cause the processing circuitry to provide an alert in response to the comparison of the sensor reading to the threshold indicating at least one nozzle of the plurality of nozzles is at least partially clogged.

19. The at least one machine-readable medium of claim 17, further comprising:

causing the cleaning solution to be provided to another conduit separate from the conduit;

collecting a second sensor reading from a second senor configured to sense movement of cleaning solution through the another conduit; and comparing the second sensor reading to a second threshold.

20. The at least one machine-readable medium of claim 17, wherein the instructions further cause the processing circuitry to provide data corresponding to the cleaning operation to a remote device via a wired or wireless interface.

* * * * *